(12) United States Patent
Yamada

(10) Patent No.: US 9,569,825 B2
(45) Date of Patent: Feb. 14, 2017

(54) IMAGE PROCESSING DEVICE, MONITORING CAMERA, AND IMAGE PROCESSING METHOD

(71) Applicant: Panasonic Intellectual Property Management Co., Ltd., Osaka (JP)

(72) Inventor: Hitoshi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/808,658

(22) Filed: Jul. 24, 2015

(65) Prior Publication Data

US 2015/0332443 A1 Nov. 19, 2015

Related U.S. Application Data

(63) Continuation of application No. PCT/JP2014/004802, filed on Sep. 18, 2014.

(30) Foreign Application Priority Data

Mar. 5, 2014 (JP) .................................. 2014-043215

(51) Int. Cl.
*G06K 9/40* (2006.01)
*G06T 5/00* (2006.01)
(Continued)

(52) U.S. Cl.
CPC ............. *G06T 5/009* (2013.01); *G06T 5/002* (2013.01); *G06T 5/003* (2013.01); *G06T 5/50* (2013.01);
(Continued)

(58) Field of Classification Search
CPC ................ G06T 7/00; G06T 5/00; H04N 5/00
(Continued)

(56) References Cited

U.S. PATENT DOCUMENTS 8,611,691 B2 * 12/2013 Vorontsov ............... G06T 5/001
348/607
2014/0320682 A1 * 10/2014 Kuwabara .............. H04N 5/357
348/208.6

FOREIGN PATENT DOCUMENTS

JP          2011-229030 A      11/2011
JP          2012-090152 A       5/2012
(Continued)

OTHER PUBLICATIONS

International Search Report issued in Application No. PCT/JP2014/004802 dated Dec. 9, 2014.

*Primary Examiner* — Abolfazl Tabatabai
(74) *Attorney, Agent, or Firm* — McDermott Will & Emery LLP

(57) ABSTRACT

An image processing device for correcting atmospheric turbulence in a first input image included in a video includes: a determination unit which determines an atmospheric turbulence intensity which indicates an intensity of the atmospheric turbulence; and a correction unit which corrects the atmospheric turbulence in the first input image, according to the atmospheric turbulence intensity determined by the determination unit, wherein the atmospheric turbulence intensity determined by the determination unit has a value that increases with an increase in a ratio of a total number of pixels each having a difference in pixel value between the first input image and a frame temporally preceding the first input image to a total number of edge pixels included in the first input image or the frame temporally preceding, the difference being a predetermined threshold or more.

20 Claims, 20 Drawing Sheets

(51) Int. Cl.
  *G06T 5/50* (2006.01)
  *H04N 5/357* (2011.01)
  *H04N 5/228* (2006.01)
  *H04N 5/14* (2006.01)

(52) U.S. Cl.
  CPC ..... *H04N 5/357* (2013.01); *G06T 2207/10016* (2013.01); *G06T 2207/20216* (2013.01); *G06T 2207/20224* (2013.01); *G06T 2207/30232* (2013.01)

(58) Field of Classification Search
  USPC ............... 382/274, 309; 348/297, 222.1, 571
  See application file for complete search history.

(56) References Cited

FOREIGN PATENT DOCUMENTS

| | | |
|---|---|---|
| JP | 2012-182625 A | 9/2012 |
| JP | 2013-122639 A | 6/2013 |
| JP | 2013-236249 A | 11/2013 |

\* cited by examiner

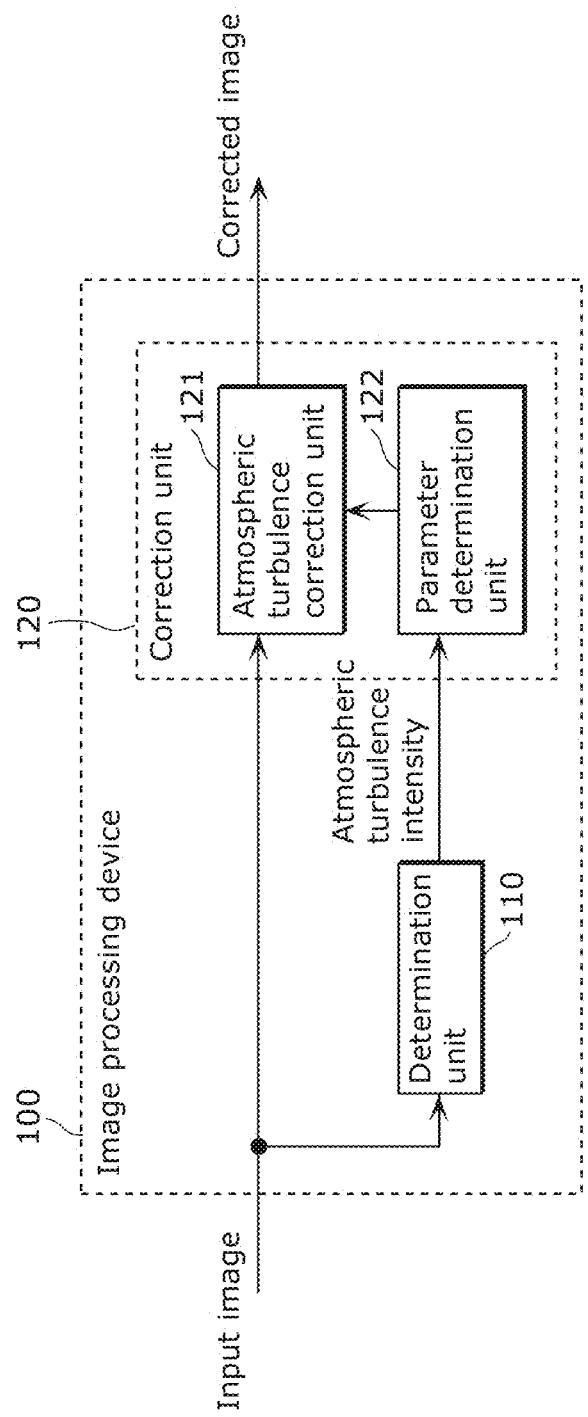

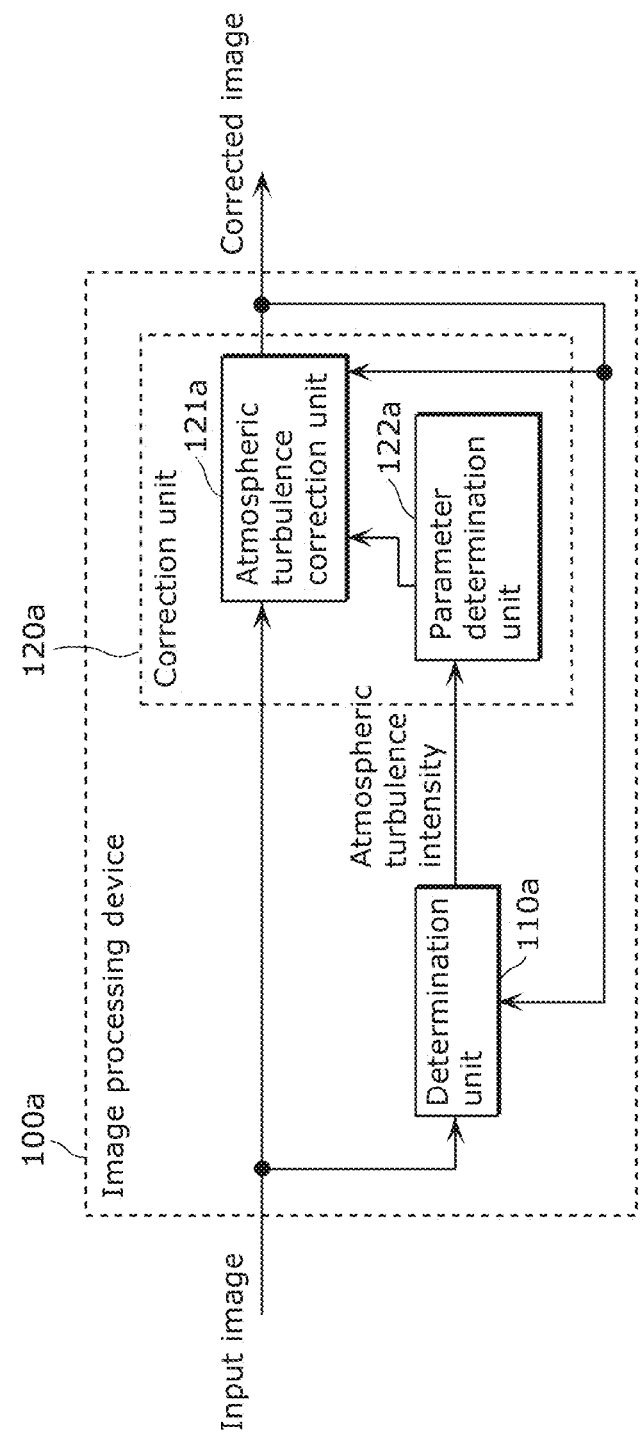

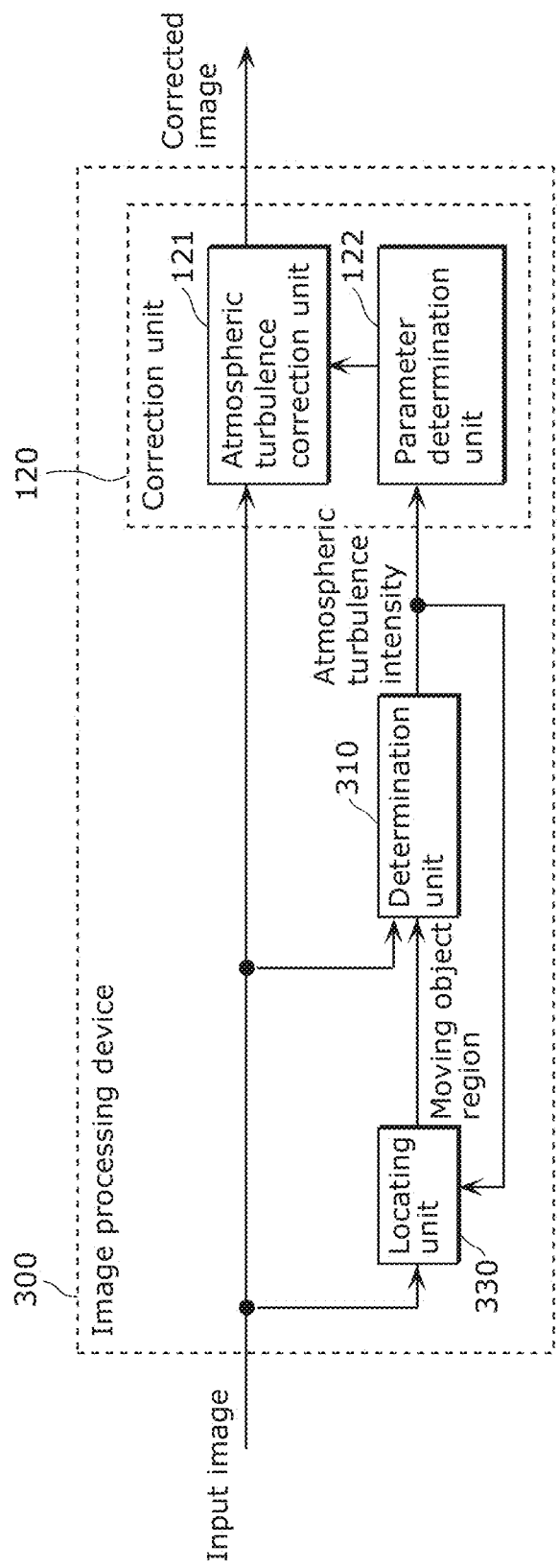

Time t-1

Time t

IMAGE PROCESSING DEVICE, MONITORING CAMERA, AND IMAGE PROCESSING METHOD

CROSS REFERENCE TO RELATED APPLICATION

This is a continuation application of PCT International Application No. PCT/JP2014/004802 filed on Sep. 18, 2014, designating the United States of America, which is based on and claims priority of Japanese Patent Application No. 2014-043215 filed on Mar. 5, 2014. The entire disclosures of the above-identified applications, including the specifications, drawings and claims are incorporated herein by reference in their entirety.

FIELD

The present disclosure relates to image processing devices, monitoring cameras, and image processing methods for correcting atmospheric turbulence in an image.

BACKGROUND

Conventionally, a monitoring system is known which captures images of a certain space using a camera device such as a monitoring camera, to monitor the space. At this time, atmospheric turbulence may occur in a captured image. Atmospheric turbulence is a phenomenon which occurs due to a change in characteristics of light transmitting media. Specifically, atmospheric turbulence is a phenomenon (Schlieren phenomenon) that occurs due to a change in a refractive index of a medium (air or water) which transmits light from a subject.

Atmospheric turbulence is so-called heat shimmer that occurs due to a difference in air density made by a temperature difference in the air when an image is captured outside on a hot day, for example. In addition, atmospheric turbulence occurs also when an image is captured underwater.

If a monitoring system detects, for instance, abnormalities from a captured video, the system may incorrectly detect atmospheric turbulence in an image as abnormalities, which is not preferable. In view of this, Patent Literatures 1 and 2, for instance, disclose an image processing device which can correct atmospheric turbulence in an image.

CITATION LIST

Patent Literature

[PTL 1] Japanese Unexamined Patent Application Publication No. 2011-229030
[PTL 2] Japanese Unexamined Patent Application Publication No. 2013-236249

SUMMARY

Technical Problem

The present disclosure provides an image processing device, a monitoring camera, and an image processing method for appropriately correcting atmospheric turbulence even if the intensity of the atmospheric turbulence changes.

Solution to Problem

In order to solve the above problem, an image processing device according to the present disclosure is an image processing device for correcting atmospheric turbulence in a first input image included in a video, the image processing device including: a determination unit configured to determine an atmospheric turbulence intensity which indicates an intensity of the atmospheric turbulence; and a correction unit configured to correct the atmospheric turbulence in the first input image, according to the atmospheric turbulence intensity determined by the determination unit, wherein the atmospheric turbulence intensity determined by the determination unit has a value that increases with an increase in a ratio of a total number of pixels each having a difference in pixel value between the first input image and a frame temporally preceding the first input image to a total number of edge pixels included in the first input image or the frame temporally preceding, the difference being a predetermined threshold or more.

Advantageous Effects

According to the present disclosure, atmospheric turbulence can be appropriately corrected even if the intensity of the atmospheric turbulence changes.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1A is a block diagram illustrating a configuration of an image processing device according to Embodiment 1.

FIG. 1B is a block diagram illustrating another configuration of the image processing device according to Embodiment 1.

FIG. 6A is a block diagram illustrating a configuration of an image processing device according to Embodiment 2.

DESCRIPTION OF EMBODIMENTS

Figure 1C:
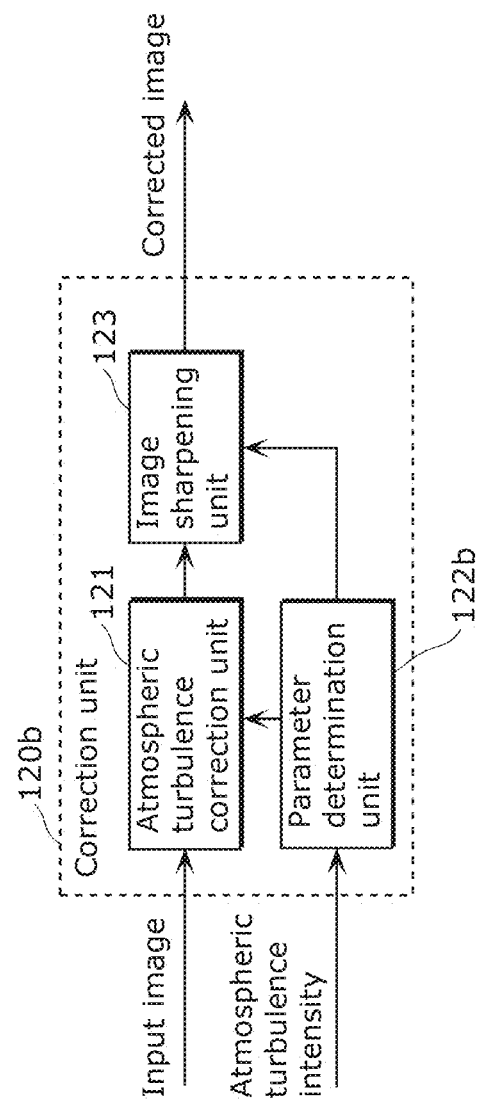
FIG. 1C is a block diagram illustrating another configuration of a correction unit of the image processing device according to Embodiment 1.

The inventors have found that the conventional image processing device described in the "Background Art" section has the following problem.

For example, the image processing devices disclosed in PTLs 1 and 2 detect whether atmospheric turbulence has occurred in an image. If atmospheric turbulence has occurred, correction processing for a predetermined intensity is performed.

However, the same level of atmospheric turbulence correction is applied, which results in a problem that atmospheric turbulence cannot be appropriately corrected if the intensity of atmospheric turbulence changes.

In view of this, in order to solve such a problem, the present disclosure provides an image processing device, a monitoring camera, and an image processing method for appropriately correcting atmospheric turbulence even if the intensity of atmospheric turbulence changes.

The following describes embodiments in detail, with reference to the drawings as necessary. However, unnecessarily detailed description may be omitted. For example, a detailed description of the matters already known well and a repeated description of substantially the same configuration may be omitted. This is intended to avoid making the following description unnecessarily redundant, and to facilitate understanding of a person skilled in the art.

It should be noted that the inventors provide the accompanying drawings and the following description in order that a person skilled in the art sufficiently understands the present disclosure, and thus do not intend to limit a subject matter disclosed in the claims to the drawings and description.

It should be noted that the drawings are schematic diagrams, and do not necessarily provide strictly accurate illustration. The same numerals are given to equivalent constituent members throughout the drawings.

Embodiment 1

The following describes non-limiting Embodiment 1 with reference to FIGS. 1A to 5B.

[1. Outline of Image Processing Device]

The first describes configurations of image processing devices according to the present embodiment, with reference to FIGS. 1A and 1B. FIGS. 1A and 1B are block diagrams illustrating examples of the configurations of the image processing devices according to the present embodiment.

It should be noted that the image processing devices according to the present embodiment correct atmospheric turbulence in an input image using plural image frames. At this time, the image processing devices perform different processing when a corrected image is not used as one of the plural image frames and when a corrected image is used as one of the plural image frames.

The following describes a configuration of an image processing device 100 for when a corrected image is not used, with reference to FIG. 1A, and a configuration of an image processing device 100a for when a corrected image is used, with reference to FIG. 1B.

[2. Detailed Configurations of Image Processing Devices]

The image processing devices 100 and 100a according to the present embodiment correct atmospheric turbulence in an input image included in a video, to generate and output a corrected image. The image processing device 100 includes a determination unit 110 and a correction unit 120, as illustrated in FIG. 1A, whereas the image processing device 100a includes a determination unit 110a and a correction unit 120a, as illustrated in FIG. 1B.

[2-1. Determination Unit]

The determination unit 110 illustrated in FIG. 1A determines an atmospheric turbulence intensity indicating the intensity of atmospheric turbulence in an input image. The determination unit 110 determines and outputs an atmospheric turbulence intensity indicating the intensity of atmospheric turbulence in an input image using at least two input images.

For example, the determination unit 110 obtains a first input image and a frame temporally preceding the first input image. The frame temporally preceding the first input image is a second input image input prior to the first input image. Here, the first input image is an image having atmospheric turbulence to be corrected, and for example, is the most recent input image. The second input image is, for example, a frame adjacent to the first input image, or in other words, an input image frame immediately preceding the first input image. Alternatively, the second input image may be an input image frame preceding the first input image by two or more frames.

"Atmospheric turbulence" is a phenomenon which occurs due to a change in characteristics of light transmitting media, as stated above. For example, "atmospheric turbulence" is a phenomenon such as heat shimmer, and is a phenomenon (the Schlieren phenomenon) that occurs due to a change in a refractive index of a medium (such as air or water) which transmits light from a subject. To put it in a simpler way, "atmospheric turbulence" is a phenomenon in which a fixed subject which does not move appears to be moving. Accordingly, "atmospheric turbulence" occurs in an image captured by a fixed camera, not due to the camera being shaken, for instance. In particular, the effect of atmospheric turbulence is notably observed in a video telescopically captured.

"Atmospheric turbulence in an input image" is a phenomenon in which the shape of a subject is deformed in an input image. In a simple example, an edge which is straight in an input image having no "atmospheric turbulence" appears to be curved in an input image having "atmospheric turbulence".

It should be noted that although an edge appears to shift from the original position due to camera shake, the direction and amount of the shift of the edge are substantially constant. Specifically, camera shake shifts the entire image in a common direction by substantially the same amount. In contrast, the direction in which and an amount by which an edge is deformed due to "atmospheric turbulence" are irregular for each pixel.

To "correct atmospheric turbulence" decreases or eliminates a pixel shift which has occurred in an input image due to "atmospheric turbulence".

The "atmospheric turbulence intensity" indicates the magnitude of deformation of a subject in an input image. Specifically, the greater the deformation of a subject is, the higher an atmospheric turbulence intensity is. In other words, an atmospheric turbulence intensity corresponds to the amount of shift of an edge from a right position (a position at which the edge is displayed when no atmospheric turbulence is occurring).

The determination unit 110 according to the present embodiment determines an atmospheric turbulence intensity using Equation 1.

[Math 1]

$$\text{atmospheric turbulence intensity} = \frac{\text{difference amount between adjacent images}}{\text{edge amount}} \quad \text{Eq. 1}$$

In Equation 1, an edge amount is the number of edge pixels included in the first input image. Furthermore, a difference amount between adjacent images is the number of pixels each having a difference in pixel value between the first input image and the second input image, the difference being a predetermined threshold or more.

Specifically, the determination unit 110 determines an atmospheric turbulence intensity that is a ratio of the number of pixels each having a difference in pixel value between the first input image and the second input image to the number of edge pixels included in the first input image, the difference being the predetermined threshold or more. In other words, the determination unit 110 normalizes the difference amount between adjacent images with an edge amount, to calculate an atmospheric turbulence intensity.

The determination unit 110*a* illustrated in FIG. 1B differs from the determination unit 110 in that a corrected image generated by correcting atmospheric turbulence in the second input image is used instead of the second input image. Specifically, a frame temporally preceding the first input image is a corrected image generated by the correction unit 120*a* correcting atmospheric turbulence in the second input image. Furthermore, another difference is that the determination unit 110*a* calculates an edge amount using a corrected image instead of the first input image.

Specifically, the determination unit 110*a* obtains a first input image and a corrected image. Then, the determination unit 110*a* determines an atmospheric turbulence intensity that is a ratio of the number of pixels each having a difference in pixel value between the first input image and the corrected image to the number of edge pixels included in the corrected image, the difference being the predetermined threshold or more.

In this case, an edge amount in Equation 1 is the number of edge pixels included in the corrected image. Furthermore, a difference amount between adjacent images is the number of pixels each having a difference in pixel value between the first input image and the corrected image, the difference being the predetermined threshold or more.

A description is later given of a method for calculating a difference amount between adjacent images and an edge amount, with reference to FIGS. 2 and 3.

[2-2. Correction Unit]

The correction units 120 and 120*a* correct atmospheric turbulence in the first input image according to the atmospheric turbulence intensity determined by the determination units 110 and 110*a*. Specifically, the correction units 120 and 120*a* combine plural frames including the first input image, to correct atmospheric turbulence in the first input image.

For example, the correction unit 120 illustrated in FIG. 1A averages plural frames, to correct atmospheric turbulence in the first input image. Furthermore, the correction unit 120*a* illustrated in FIG. 1B calculates a weighted sum of plural frames, to correct atmospheric turbulence in the first input image.

[2-2-1. Averaging]

The first describes a configuration of the correction unit 120 which averages plural frames, which is an example of combining plural frames, with reference to FIG. 1A. As illustrated in FIG. 1A, the correction unit 120 includes an atmospheric turbulence correction unit 121 and a parameter determination unit 122.

[2-2-2. Atmospheric Turbulence Correction Unit]

The atmospheric turbulence correction unit 121 combines plural frames including the first input image, to correct atmospheric turbulence in the first input image. For example, the atmospheric turbulence correction unit 121 averages plural frames.

Specifically, the atmospheric turbulence correction unit 121 averages n input image frames on a pixel-by-pixel basis, to generate a corrected image. Here, n is an integer of 2 or more, and is an example of a parameter determined by the parameter determination unit 122.

For example, the atmospheric turbulence correction unit 121 averages temporally successive n input images including the first input image. Specifically, the atmospheric turbulence correction unit 121 averages n input images as indicated by Equation 2, from the first input image back to an n-th input image temporally preceding the first input image by n, to generate a corrected image.

[Math 2]

$$\text{output}[t] = \frac{1}{n}\sum_{k=1}^{n}\text{input}[t-k+1] \qquad \text{Eq. 2}$$

In Equation 2, output [t] is a corrected image corresponding to an input image at time t, and input [t] is an input image (or in other words, a first input image) at time t. It should be noted that n input images to be averaged may not be temporally successive n images.

Furthermore, the atmospheric turbulence correction unit 121 may calculate a weighted sum of n input images, rather than averaging the n input images. For example, the closer a corresponding input image is to time t, the greater weight may be used for calculating a weighted sum. Furthermore, a greater weight may be used only for an input image at time t, and weights for the remaining images may be evenly averaged.

It should be noted that if the atmospheric turbulence correction unit 121 averages images, the averaged image may further blur in addition to the blurring due to atmospheric turbulence in the image. The greater the number of images to be averaged is, the more blurry an averaged image, namely, an image whose atmospheric turbulence has been corrected appears.

In view of this, for example, an image sharpening unit 123 which sharpens an image may be included as the correction unit 120b illustrated in FIG. 1C. It should be noted that FIG. 1C is a block diagram illustrating a configuration of the correction unit 120b according to the present embodiment. The image processing device 100 according to the present embodiment may include the correction unit 120b illustrated in FIG. 1C, instead of the correction unit 120 illustrated in FIG. 1A.

The correction unit 120b includes the atmospheric turbulence correction unit 121, the parameter determination unit 122b, and the image sharpening unit 123. A description of the parameter determination unit 122b is given later.

The image sharpening unit 123 sharpens an input image whose atmospheric turbulence has been corrected by the atmospheric turbulence correction unit 121. In the present embodiment, an image whose atmospheric turbulence has been corrected is sharpened using a filter size determined by the parameter determination unit 122b. For example, the image sharpening unit 123 performs filter processing for sharpening an image, such as an unsharp mask, on an image whose atmospheric turbulence has been corrected. This achieves a reduction in blurring due to atmospheric turbulence in an image and blurring caused by averaging images.

[2-2-3. Parameter Determination Unit]

The parameter determination unit 122 determines a parameter to be used for combining plural frames, according to an atmospheric turbulence intensity determined by the determination unit 110. For example, the parameter determination unit 122 determines a parameter that is the number of frames to be used for averaging, according to the atmospheric turbulence intensity determined by the determination unit 110. Specifically, the parameter determination unit 122 determines a parameter that is the value of n in Equation 2.

Atmospheric turbulence in an input image is considered to be occurring at a constant amplitude, with respect to a position of each subject when no atmospheric turbulence is occurring. Accordingly, averaging plural images generates an image having a lowered level of atmospheric turbulence.

At this time, the more input images are averaged, the greater effect of atmospheric turbulence elimination is achieved. Conversely, the less input images are averaged, the smaller atmospheric turbulence elimination effect is achieved.

Accordingly, the parameter determination unit 122 determines the number of frames to be used for averaging, according to the atmospheric turbulence intensity. Specifically, the parameter determination unit 122 increases the value of n if the atmospheric turbulence intensity is high, and decreases the value of n if the atmospheric turbulence intensity is low.

It should be noted that the parameter determination unit 122b illustrated in FIG. 1C determines a parameter that is a filter size for sharpening, according to the atmospheric turbulence intensity determined by the determination unit 110. Specifically, the parameter determination unit 122b determines the filter size such that the greater the atmospheric turbulence intensity is, the higher a degree at which an image is sharpened by the image sharpening unit 123 is. For example, if the image sharpening unit 123 applies an unsharp mask, the parameter determination unit 122b increases a filter size of the unsharp mask with an increase in the atmospheric turbulence intensity. In this manner, the higher the atmospheric turbulence intensity is, the more a degree of image sharpening can be increased, thus achieving a reduction of blurring due to atmospheric turbulence in an image and blurring caused by averaging images.

[2-2-4. Calculation of Weighted Sum]

The following describes the configuration of the correction unit 120a which calculates a weighted sum, which is an example of combining plural frames, with reference to FIG. 1B. As illustrated in FIG. 1B, the correction unit 120a includes an atmospheric turbulence correction unit 121a and a parameter determination unit 122a.

[2-2-5. Atmospheric Turbulence Correction Unit]

The atmospheric turbulence correction unit 121a calculates a weighted sum of a first input image and a corrected image. In other words, the atmospheric turbulence correction unit 121a combines the first input image and the corrected image at a certain combining ratio $\alpha$. The combining ratio $\alpha$ is a weight for calculating a weighted sum, and is an example of a parameter determined by the parameter determination unit 122a.

For example, the atmospheric turbulence correction unit 121a calculates a weighted sum of pixel values of the first input image and a corrected image generated by correcting an input image immediately prior to the first input image. Specifically, the atmospheric turbulence correction unit 121a generates a corrected image output [t], using the weight $\alpha$, an input image input [t], and an immediately preceding corrected image output [t−1], as indicated by Equation 3.

[Math 3]

$$\text{output}[t]=\alpha\cdot\text{input}[t]+(1-\alpha)\cdot\text{output} \qquad \text{Eq. 3:}$$

The weight $\alpha$ ($0\leq\alpha\leq1$) is a combining ratio of the input image input [t]. Specifically, the closer the weight $\alpha$ is to 1, the greater a proportion of the input image to the corrected image is. Further, the closer the weight $\alpha$ is to 0, the greater a proportion of the previously corrected image to the corrected image is.

[2-2-6. Parameter Determination Unit]

The parameter determination unit 122a determines a parameter that is a weight for calculating a weighted sum, according to the atmospheric turbulence intensity determined by the determination unit 110a. Specifically, the parameter determination unit 122a determines the weight α in Equation 3.

For example, the parameter determination unit 122a determines the weight α having a value that decreases with an increase in the atmospheric turbulence intensity, or specifically, determines the weight α such that the higher the atmospheric turbulence intensity is, the closer the value is to 0. Furthermore, the parameter determination unit 122a determines the weight α having a value that increases with a decrease in the atmospheric turbulence intensity, or specifically, determines the weight α such that the lower the atmospheric turbulence intensity is, the closer the value is to 1.

For example, in Equation 3, the smaller a proportion (weight α) for combining an input image input [t] is, the more the previously corrected image output [t−1], namely, an image having less atmospheric turbulence is combined. Accordingly, images are combined such that the greater atmospheric turbulence is, the higher a proportion of the previously corrected image is, thus decreasing atmospheric turbulence in the corrected image to be generated.

It should be noted that the present embodiment has described an example of combining two frames, yet the atmospheric turbulence correction unit 121a may combine three or more frames. At this time, the parameter determination unit 122a may determine weights for the frames such that the sum of proportions for combining the three or more frames is 1.

In addition, although the present embodiment has described averaging and calculating a weighted sum as examples of combinations, the method for correcting atmospheric turbulence is not limited to these.

[3. Calculation of Atmospheric Turbulence Intensity]

The following describes a method for calculating an edge amount to be used for calculation of an atmospheric turbulence intensity, and an amount of a difference between adjacent images.

[3-1. Edge Amount]

An edge appears as a difference in luminance value in an image. Accordingly, an edge appears in a portion having high contrast. For example, an edge pixel is a pixel having a luminance value differing from a neighboring pixel by a predetermined threshold or more.

The determination unit 110 determines, for each pixel included in the first input image, whether the pixel is an edge pixel. For example, the determination unit 110 detects, for each pixel, the presence or absence of an edge, using a Sobel filter for vertical and horizontal directions. Then, the determination unit 110 counts the number of pixels each determined to be an edge pixel.

Specifically, the determination unit 110 determines whether a value calculated by applying the Sobel filter to a pixel of interest is greater than or equal to a predetermined threshold. If the determination unit 110 determines that the value is greater than or equal to the threshold, the determination unit 110 determines the pixel of interest to be an edge pixel, and increments a counter value. The counter value obtained after performing edge determination on all the pixels included in the first input image is the number of edge pixels in the first input image.

It should be noted that although the determination unit 110 uses the first input image as an image to be subjected to edge detection, the present embodiment is not limited to this. For example, the determination unit 110a illustrated in FIG. 1B uses a corrected image as an image to be subjected to edge detection.

For example, the determination unit 110a uses a previously corrected image as an image to be subjected to edge detection. Specifically, the determination unit 110a performs edge detection using a corrected image generated by correcting atmospheric turbulence in an input image immediately preceding the first input image.

For example, if edge detection is performed using an image having great atmospheric turbulence, the shape of an edge changes due to atmospheric turbulence, and thus the number of edge pixels detected as a result changes. Accordingly, an accurate edge amount cannot be calculated.

In contrast, a corrected image used by the determination unit 110a has less atmospheric turbulence, and thus an edge can be detected with higher accuracy.

It should be noted that the determination units 110 and 110a may use, for instance, a Prewitt Filter and a Laplacian Filter, instead of the Sobel filter. In addition, an edge detection process is not limited to the above described processing.

[3-2. Difference Amount Between Adjacent Images]

The determination unit 110 determines, for each pixel included in the first input image, whether the pixel has a great difference from a previous frame (which may be referred to as a "difference pixel", hereinafter). It should be noted that a difference pixel is, for example, a pixel having a difference in pixel value between the first input image and a frame temporally preceding the first input image, the difference being a predetermined threshold or more.

Specifically, the determination unit 110 calculates, for each pixel, a difference between a pixel value of the pixel in the first input image and a pixel value of the pixel in the second input image, and determines whether the calculated difference is greater than or equal to the predetermined threshold. Then, if the determination unit 110 determines that the calculated difference is greater than or equal to the threshold, the determination unit 110 determines that the pixel of interest is a difference pixel, and increments the counter value. The counter value obtained after determining differences for all the pixels included in the first input image is the number of difference pixels in the first input image.

For example, if a time interval at which two images are captured is sufficiently short, a pixel having a difference in pixel value between two frames captured with a fixed camera belongs to either a moving object which is a subject that moves or atmospheric turbulence. In other words, a difference pixel belongs to either a moving object or atmospheric turbulence.

If a moving object is not present in two frames or if it can be expected that a sufficiently small number of pixels occupy a moving object, a difference pixel can be considered to belong to atmospheric turbulence rather than a moving object. Accordingly, the number of difference pixels can be considered to be the number of pixels in atmospheric turbulence.

It should be noted that Embodiment 2 describes the case where a large number of pixels occupy a moving object, or in other words, a moving object is large.

Although the determination unit 110 uses the first input image and the second input image for calculation of a difference, the present embodiment is not limited to this. For example, the determination unit 110a illustrated in FIG. 1B uses the first input image and a corrected image for calculation of a difference.

For example, the determination unit 110a calculates a difference between the first input image and the corrected image generated by correcting atmospheric turbulence in the second input image, to calculate the number of difference pixels. In other words, the determination unit 110a calculates a difference between an image with much atmospheric turbulence (the first input image) and an image with little atmospheric turbulence (corrected image).

For example, if two images used for calculation of a difference have atmospheric turbulence, an accurate difference amount (the amount of atmospheric turbulence) may not be calculated. To address this, the determination unit 110a calculates a difference between the first input image and a corrected image, and thus can calculate a difference amount close to the accurate amount of atmospheric turbulence in the first input image.

It should be noted that a value of an atmospheric turbulence intensity may differ for each frame due to effects of noise and a threshold, for instance. If atmospheric turbulence is eliminated using values of atmospheric turbulence intensities different for frames, a stable atmospheric turbulence eliminating effect is not achieved. In order to avoid this, an atmospheric turbulence intensity may be generated using only a certain frame. Alternatively, an average value of plural atmospheric turbulence intensities generated using plural frames may be used as an atmospheric turbulence intensity.

[4. Relation of Atmospheric Turbulence Intensity to Edge Amount and Difference Amount]

Figure 2:
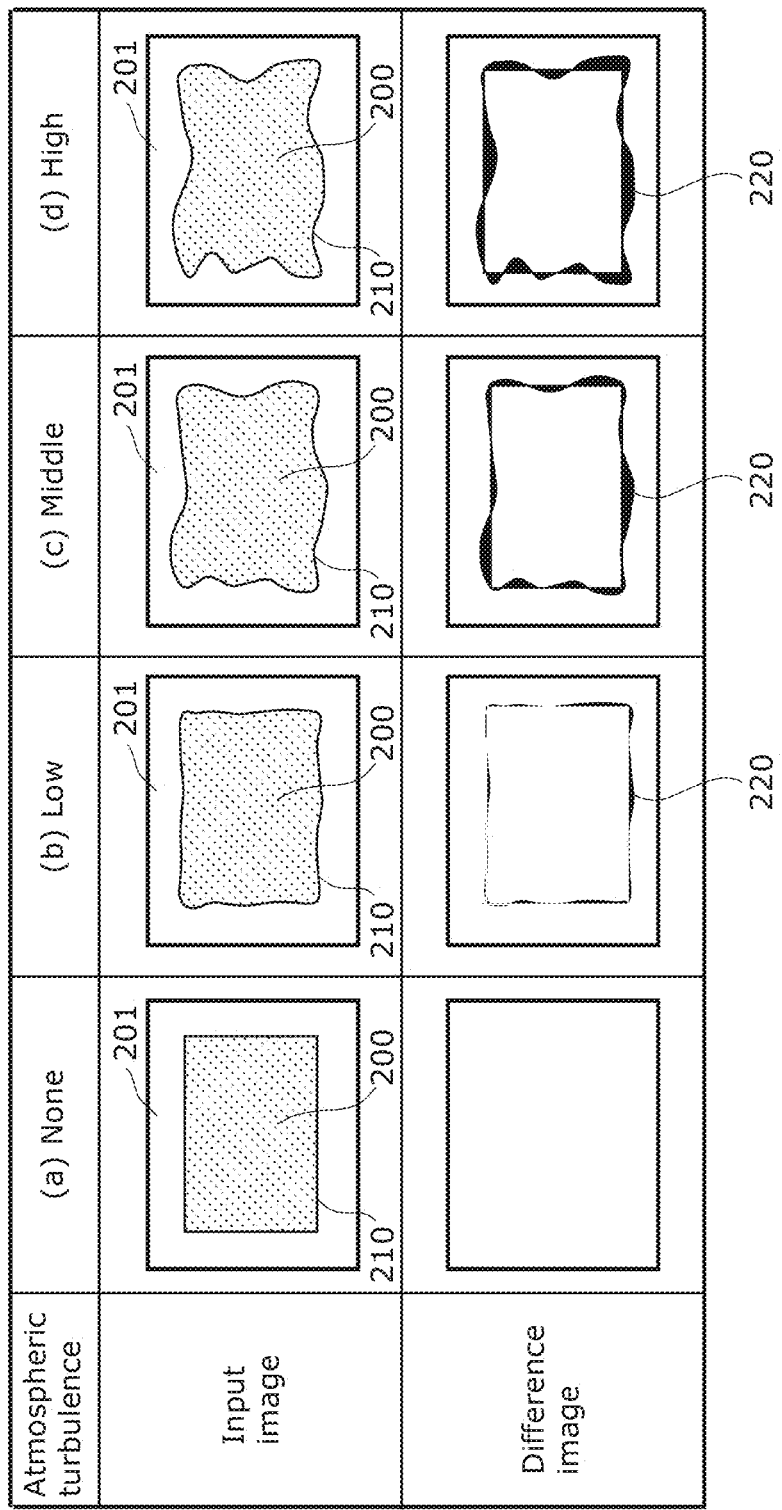
FIG. 2 illustrates difference images generated by the image processing device according to Embodiment 1 when atmospheric turbulence having different intensities occurs.
Figure 3:
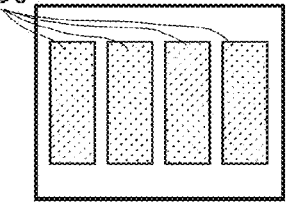
FIG. 3 illustrates difference images generated by the image processing device according to Embodiment 1 when an input image includes a single object and when an input image includes plural objects.

The following describes a relation of an atmospheric turbulence intensity to an edge amount and a difference amount according to the present embodiment, with reference to FIGS. 2 and 3. FIG. 2 illustrates difference images generated by the image processing device according to the present embodiment when atmospheric turbulence having different intensities occurs. FIG. 3 illustrates difference images generated by the image processing device according to the present embodiment when an input image includes plural objects and when an input image includes a single object.

In the examples illustrated in FIG. 2, the input images each include a rectangular object 200. As illustrated in (a) of FIG. 2, if the image has no atmospheric turbulence, edges (contours) 210 of the object 200 are straight lines. To facilitate a description, an example is given in which the objects 200 all have the same luminance value and backgrounds 201 also all have the same luminance value, whereas the objects 200 and the backgrounds 201 have different luminance values.

The higher an atmospheric turbulence intensity is, the higher a degree of deformation of the object 200 is, as illustrated in (b) to (d) of FIG. 2. Specifically, the edges (contours) 210 of the objects 200 are curved. The higher an atmospheric turbulence intensity is, the more the edges 210 shift from the original positions.

It should be noted that atmospheric turbulence as stated above is not a shift in a determined direction, which differs from camera shake. Thus, the shift amounts of the edges 210 randomly vary depending on pixel positions of the edges 210, as illustrated in FIG. 2.

The difference images illustrated in FIG. 2 show differences between an image having no atmospheric turbulence and images including atmospheric turbulence. For example, a difference image whose atmospheric turbulence intensity is "low" shows a difference between an input image whose atmospheric turbulence intensity is "low" and an image having no atmospheric turbulence. The same applies to the cases where atmospheric turbulence intensities are "middle" and "high".

As illustrated in FIG. 2, if atmospheric turbulence occurs in an input image, difference regions 220 appear in difference images. The difference regions 220 are formed by pixels (difference pixels) each having a difference in pixel value between an image having no atmospheric turbulence and an image having atmospheric turbulence, the difference being a predetermined threshold or more. Accordingly, the number of difference pixels forming the difference region 220 corresponds to, for example, a difference amount between adjacent images in Equation 1.

As illustrated in (b) to (d) of FIG. 2, the higher an atmospheric turbulence intensity is, the greater a degree of deformation of the object 200 is, which consequently increases the difference region 220. The difference region 220 appears in a region corresponding to a region at and near the edge 210 of the object 200.

The above shows that the greater the difference region 220 is, or in other words, the greater a difference amount between adjacent images is, the higher an atmospheric turbulence intensity is.

However, this is limited to the case where an input image includes a single object 200. In addition, also in the case where another object is sufficiently smaller than the object 200, it can be said that the greater a difference amount between adjacent images is, the higher an atmospheric turbulence intensity is.

In contrast, as illustrated in FIG. 3, if an input image includes plural objects 230, an edge amount increases. A difference region appears in a region corresponding to an edge, and thus the more edges are included, the larger a difference region is.

Accordingly, even if atmospheric turbulence intensities are different, difference regions may be substantially the same depending on the number of objects included in input images, or in other words, edge amounts. For example, as illustrated in FIG. 3, difference regions 240 generated when an input image includes the plural objects 230 and an atmospheric turbulence intensity is "middle" are substantially the same as the difference region 220 generated when an input image includes a single object 200 and an atmospheric turbulence intensity is "high".

Accordingly, an atmospheric turbulence intensity cannot be determined only by the size of a difference region. Specifically, the size of a difference region depends on both the edge amount and an atmospheric turbulence intensity.

In view of this, the determination units 110 and 110a according to the present embodiment normalize the size of a difference region, or namely, a difference amount between adjacent images using an edge amount, to determine an atmospheric turbulence intensity, as indicated by Equation 1. In this manner, an appropriate atmospheric turbulence intensity can be determined, independently of an edge amount included in an input image.

[5. Operation]
[5-1. When No Corrected Image is Used]

Figure 4A:
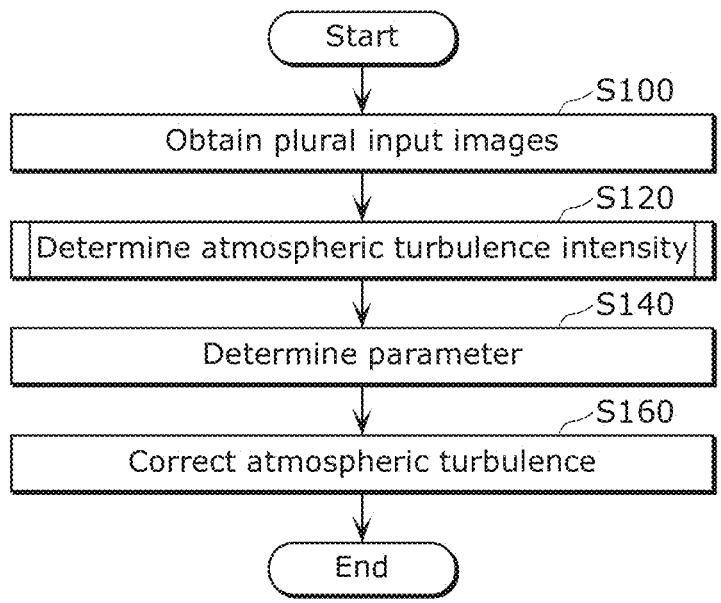
FIG. 4A is a flowchart illustrating an example of operation of the image processing device according to Embodiment 1.

The following describes operation of the image processing devices 100 and 100a according to the present embodiment, with reference to FIGS. 4A to 5B. The first describes operation of the image processing device 100 according to the present embodiment, or specifically, processing for correcting atmospheric turbulence in an input image without using a corrected image, with reference to FIGS. 4A and 4B. FIG. 4A is a flowchart illustrating operation of the image processing device 100 according to the present embodiment.

Figure 4B:
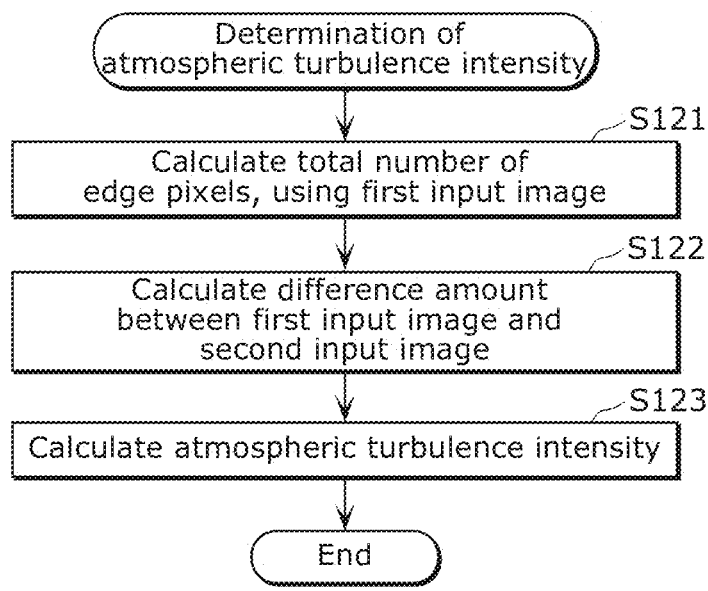
FIG. 4B is a flowchart illustrating an example of processing for determining an atmospheric turbulence intensity according to Embodiment 1.

FIG. 4B is a flowchart illustrating processing for determining an atmospheric turbulence intensity, according to the present embodiment.

First, the determination unit 110 obtains plural input images, as illustrated in FIG. 4A (S100). Specifically, the determination unit 110 obtains a first input image whose atmospheric turbulence is to be corrected and a second input image input prior to the first input image.

Next, the determination unit 110 determines an atmospheric turbulence intensity (S120). A description is later given of details of a method for determining an atmospheric turbulence intensity, with reference to FIG. 4B.

Next, the parameter determination unit 122 determines a parameter according to the atmospheric turbulence intensity determined by the determination unit 110 (S140). Specifically, the parameter determination unit 122 determines a parameter that is a total number n of frames which is a value that increases with an increase in an atmospheric turbulence intensity.

Lastly, the atmospheric turbulence correction unit 121 corrects atmospheric turbulence in the first input image using the parameter determined by the parameter determination unit 122 (S160). Specifically, the atmospheric turbulence correction unit 121 averages n input images, the number of which is determined by the parameter determination unit 122, to correct atmospheric turbulence in the first input image, and outputs the corrected image.

Here, a description is given of a method for determining an atmospheric turbulence intensity by the determination unit 110, with reference to FIG. 4B.

As illustrated in FIG. 4B, the determination unit 110 calculates the number of edge pixels, using the first input image (S121). For example, the determination unit 110 determines, for each pixel, whether the pixel of interest is an edge pixel, and counts pixels each determined to be an edge pixel, thus calculating the number of edge pixels in the first input image.

Next, the determination unit 110 calculates a difference amount between the first input image and the second input image (S122). The difference amount is the number of pixels (difference pixels) each having a difference value between adjacent images which is greater than or equal to a predetermined threshold, as described above. For example, the determination unit 110 determines, for each pixel, whether the pixel of interest is a difference pixel, and counts pixels each determined to be a difference pixel, thus calculating a difference amount.

Lastly, the determination unit 110 calculates an atmospheric turbulence intensity based on Equation 1 (S123).

[5-2. When Corrected Image is Used]

Figure 5A:
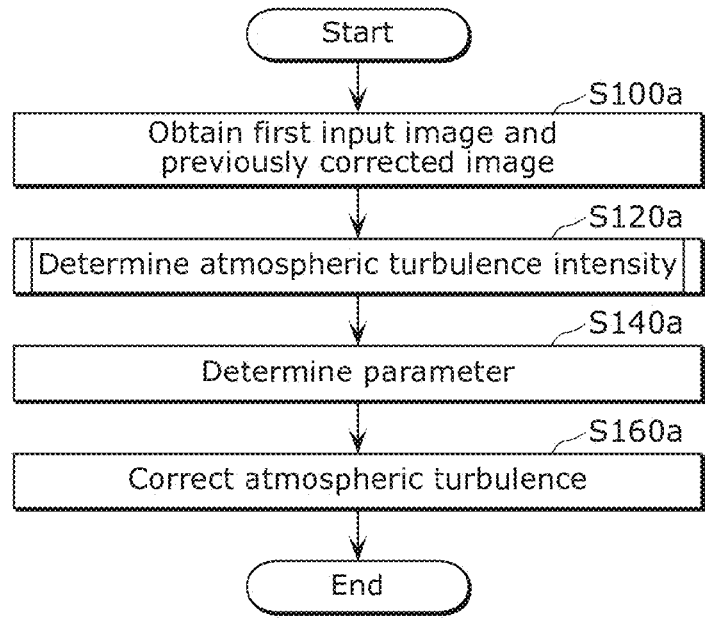
FIG. 5A is a flowchart illustrating another example of operation of the image processing device according to Embodiment 1.
Figure 5B:
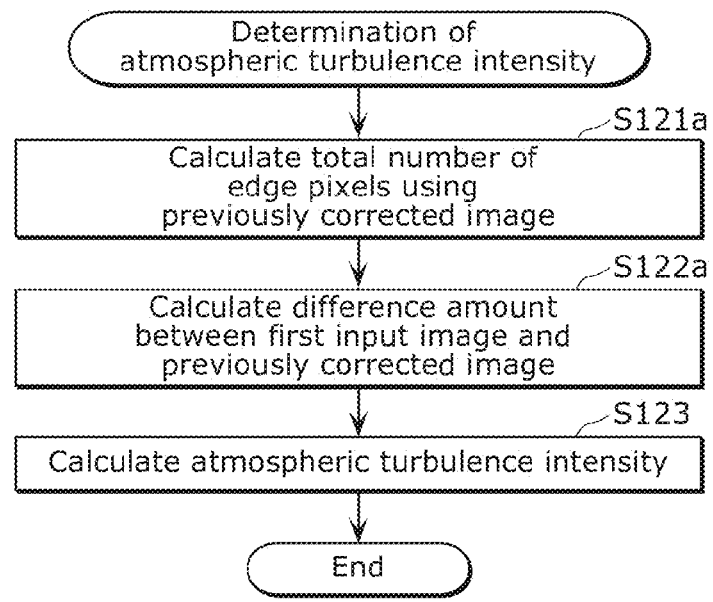
FIG. 5B is a flowchart illustrating another example of processing for determining an atmospheric turbulence intensity according to Embodiment 1.

The following describes operation of the image processing device 100a according to the present embodiment, or specifically, processing for correcting atmospheric turbulence in an input image using a corrected image, with reference to FIGS. 5A and 5B. FIG. 5A is a flowchart illustrating operation of the image processing device 100a according to the present embodiment. FIG. 5B is a flowchart illustrating processing for determining an atmospheric turbulence intensity, according to the present embodiment.

As illustrated in FIG. 5A, first, the determination unit 110a obtains a first input image and a previously corrected image (S100a). Specifically, the determination unit 110a obtains a first input image whose atmospheric turbulence is to be corrected, and a corrected image generated by correcting atmospheric turbulence in a second input image input prior to the first input image.

Next, the determination unit 110a determines an atmospheric turbulence intensity (S120a). A description is later given of details of a method for determining an atmospheric turbulence intensity, with reference to FIG. 5B.

Next, the parameter determination unit 122a determines a parameter according to the atmospheric turbulence intensity determined by the determination unit 110a (S140a). Specifically, the parameter determination unit 122a determines a weight α for the first input image such that the higher an atmospheric turbulence intensity is, the smaller value the weight α has, and determines a weight 1−α for a corrected image such that the higher an atmospheric turbulence intensity is, the greater value the weight 1−α has.

Lastly, the atmospheric turbulence correction unit 121a corrects atmospheric turbulence in the first input image using the parameter determined by the parameter determination unit 122a (S160a). Specifically, the atmospheric turbulence correction unit 121a calculates a weighted sum of the first input image and the corrected image using the weight α determined by the parameter determination unit 122a, to correct atmospheric turbulence in the first input image.

Here, a description is given of the method for determining the atmospheric turbulence intensity by the determination unit 110a, with reference to FIG. 5B.

As illustrated in FIG. 5B, the determination unit 110a calculates the number of edge pixels using a previously corrected image (S121a). For example, the determination unit 110a determines, for each pixel, whether the pixel of interest is an edge pixel, and counts pixels each determined to be an edge pixel, thus calculating the number of edge pixels in the previously corrected image.

Next, the determination unit 110a calculates a difference amount between the first input image and the corrected image (S122a). For example, the determination unit 110a determines, for each pixel, whether the pixel of interest is a difference pixel and counts pixels each determined to be a difference pixel, thus calculating a difference amount.

Lastly, the determination unit 110a calculates an atmospheric turbulence intensity based on Equation 1 (S123).

[6. Conclusion]

As described above, the image processing device 100 according to the present embodiment is the image processing device 100 for correcting atmospheric turbulence in a first input image included in a video, the image processing device including: the determination unit 110 configured to determine an atmospheric turbulence intensity which indicates an intensity of the atmospheric turbulence; and the correction unit 120 configured to correct the atmospheric turbulence in the first input image, according to the atmospheric turbulence intensity determined by the determination unit 100, wherein the atmospheric turbulence intensity determined by the determination unit 110 has a value that increases with an increase in a ratio of a total number of pixels each having a difference in pixel value between the first input image and a frame temporally preceding the first input image to a total number of edge pixels included in the first input image or the frame temporally preceding, the difference being a predetermined threshold or more.

In this manner, atmospheric turbulence in the first input image is corrected according to the determined atmospheric turbulence intensity, and thus atmospheric turbulence can be corrected appropriately even if the intensity of atmospheric turbulence changes. At this time, the number of pixels (difference amount) each having a difference value greater than or equal to a threshold depends on the intensity of atmospheric turbulence and the number of edge pixels.

Thus, an appropriate atmospheric turbulence intensity can be determined by normalizing a difference amount using the number of edge pixels. Accordingly, even if, for example, an input image includes plural images and many edges, the intensity of atmospheric turbulence can be determined appropriately.

For example, in the present embodiment, the frame temporally preceding is a second input image input prior to the first input image or a corrected image generated by the correction unit 120a correcting atmospheric turbulence in the second input image.

In this manner, for example, the previously corrected image, or namely, an image whose atmospheric turbulence has been corrected can be used. Thus, an atmospheric turbulence intensity can be more appropriately determined, and atmospheric turbulence can be more appropriately corrected.

For example, in the present embodiment, the correction unit 120 includes: the atmospheric turbulence correction unit 121 configured to combine plural frames including the first input image, to correct the atmospheric turbulence in the first input image; and the parameter determination unit 122 configured to determine a parameter to be used for combining the plural frames, according to the atmospheric turbulence intensity determined by the determination unit 110.

In this manner, plural frames are combined using a parameter determined according to the atmospheric turbulence intensity, and thus for example, combining proportions can be changed according to the atmospheric turbulence intensity. Accordingly, atmospheric turbulence in the first input image can be corrected appropriately, according to the intensity of atmospheric turbulence in the first input image.

For example, in the present embodiment, the atmospheric turbulence correction unit 121 is configured to average the plural frames to combine the plural frames, and the parameter determined by the parameter determination unit 122 according to the atmospheric turbulence intensity determined by the determination unit 110 is a total number of frames to be used for averaging the plural frames.

Atmospheric turbulence is considered to be occurring at a constant amplitude, with respect to a position of each subject when no atmospheric turbulence is occurring, and thus plural image frames are averaged to generate an image having a lower degree of atmospheric turbulence. At this time, the number of frames to be averaged is determined according to the atmospheric turbulence intensity and thus, atmospheric turbulence can be corrected appropriately according to the intensity of atmospheric turbulence. For example, the number of frames is increased if an atmospheric turbulence intensity is high, thus allowing great atmospheric turbulence to be corrected appropriately.

For example, in the present embodiment, the atmospheric turbulence correction unit 121a may be configured to calculate a weighted sum of the first input image and the corrected image, to combine the plural frames, and the parameter determined by the parameter determination unit 122a according to the atmospheric turbulence intensity determined by the determination unit 110a may be a weight for calculating the weighted sum.

In this manner, a weighted sum of an input image and a corrected image having little atmospheric turbulence is calculated, and thus atmospheric turbulence in an input image can be corrected. At this time, a weight is determined according to the atmospheric turbulence intensity, and thus atmospheric turbulence can be corrected appropriately. For example, a weight for a corrected image is increased with an increase in an atmospheric turbulence intensity, which allows an image obtained by calculating a weighted sum to have a higher proportion of the corrected image with little atmospheric turbulence, thus appropriately correcting atmospheric turbulence.

Embodiment 2

The following describes non-limiting Embodiment 2 with reference to FIGS. 6A to 9C.

[1. Outline of Image Processing Device]

Figure 6B:
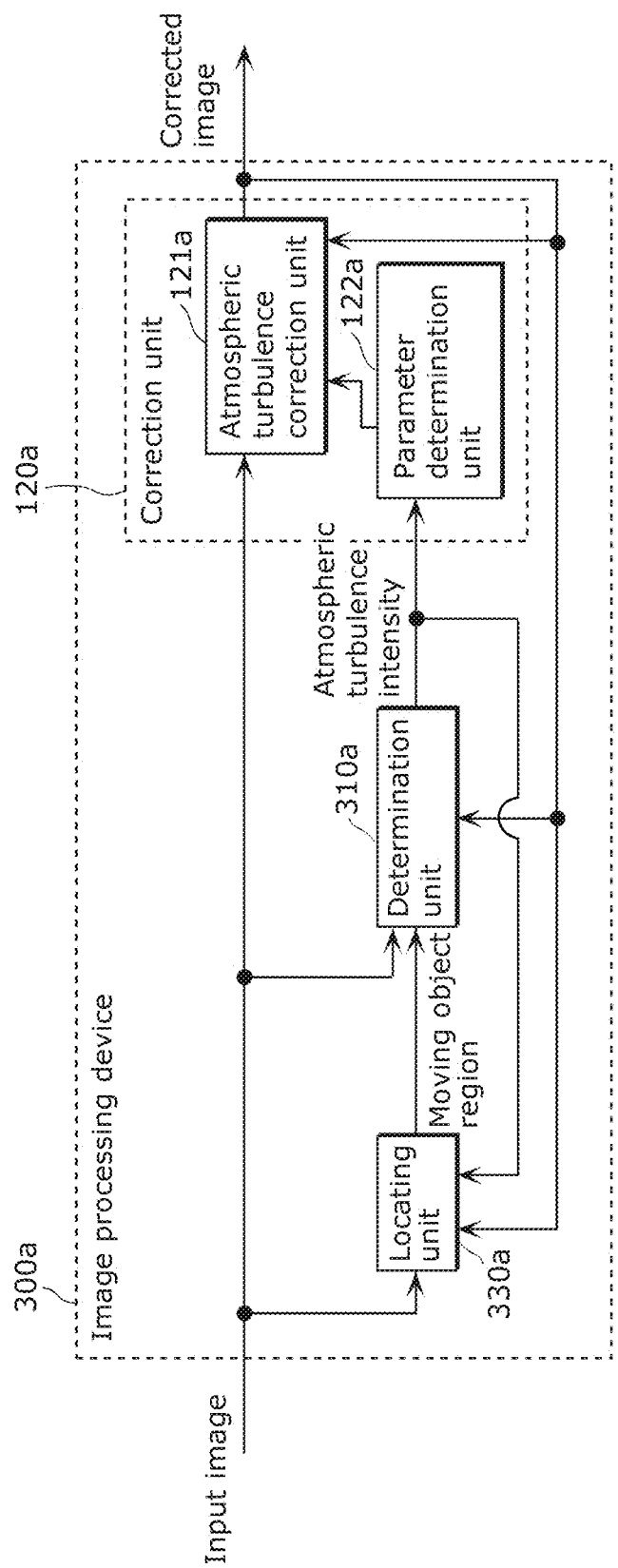
FIG. 6B is a block diagram illustrating another configuration of the image processing device according to Embodiment 2.

The first describes a configuration of an image processing device according to the present embodiment, with reference to FIGS. 6A and 6B. FIGS. 6A and 6B are block diagrams illustrating examples of configurations of image processing devices according to the present embodiment.

Image processing devices 300 and 300a according to the present embodiment can appropriately correct atmospheric turbulence if an input image includes a moving object which is a subject that moves.

The image processing devices 100 and 100a according to Embodiment 1 are useful when a moving object is not present in two frames and when the number of pixels occupied by a moving object is expected to be sufficiently small. This is because a moving object exerts a small influence, and thus an atmospheric turbulence intensity can be calculated without taking the moving object into consideration.

However, if an input image has quite a few pixels which a moving object occupies, the moving object exerts a greater effect to the atmospheric turbulence intensity. Specifically, a difference amount between adjacent images obtained by Equation 1 includes a difference due to the movement of a moving object. In other words, a difference amount between adjacent images includes not only the magnitude of atmospheric turbulence and an edge amount, but also the amount of movement of the moving object.

In view of this, according to the image processing devices 300 and 300a according to the present embodiment, when an atmospheric turbulence intensity is calculated, a moving object region which includes a moving object is located and separated, and thus an appropriate atmospheric turbulence intensity can be calculated.

It should be noted that the image processing devices according to the present embodiment also perform different processing for when a corrected image is not used as one of plural image frames and for when a corrected image is used as one of plural image frames, as with Embodiment 1.

The following describes the configuration of the image processing device 300 for when a corrected image is not used, with reference to FIG. 6A, and also the configuration of the image processing device 300a for when a corrected image is used, with reference to FIG. 6B.

[2. Detailed Configuration of Image Processing Device]

As illustrated in FIG. 6A, the image processing device 300 differs from the image processing device 100 illustrated in FIG. 1A in that a determination unit 310 is included instead of the determination unit 110, and a locating unit 330 is newly included. As illustrated in FIG. 6B, the image processing device 300a differs from the image processing device 100a illustrated in FIG. 1B in that a determination unit 310a is included instead of the determination unit 110a, and a locating unit 330a is newly included. The following mainly describes the differences, and may not describe the same points.

[2-1. Locating Unit]

The locating unit 330 illustrated in FIG. 6A locates a moving object region which includes a moving object that moves between an input image and a previous frame. For example, the locating unit 330 obtains plural input image frames and a previous atmospheric turbulence intensity, to locate a moving object region and output the locating result.

Specifically, the locating unit 330 locates a moving object region that is a closed region having a predetermined size or more, which is included in a difference region formed by pixels each having a difference value that is a threshold or more between the first input image and the second input image. To put it in a simpler way, the locating unit 330 locates a moving object region that is a region which is an aggregation of many difference pixels. At this time, the locating unit 330 determines a parameter corresponding to the above predetermined size, according to the atmospheric turbulence intensity determined by the determination unit 310.

The locating unit 330a illustrated in FIG. 6B differs from the locating unit 330 in that a corrected image generated by correcting atmospheric turbulence in a second input image is used instead of the second input image. For example, the locating unit 330a locates a moving object region that is a closed region having a predetermined size or more, which is included in a difference region formed by pixels each having a difference value that is a threshold or more between the first input image and the corrected image.

A description of specific details of a moving object region will be later given, with reference to FIGS. 7A to 7F.

[2-2. Determination Unit]

The determination unit 310 illustrated in FIG. 6A determines an atmospheric turbulence intensity, using a region other than the moving object region located by the locating unit 330. For example, the determination unit 310 uses a region other than the moving object region, as a region to be used for calculating an edge amount and a difference amount. Specifically, the determination unit 310 calculates an edge amount and a difference amount based on pixels in the limited region, rather than pixels of the entire input image. It should be noted that a specific operation of the determination unit 310 is the same as the operation of the determination unit 110 illustrated in FIG. 1A, except that the region for calculation is limited.

The determination unit 310a illustrated in FIG. 6B differs from the determination unit 310 in that a corrected image is used instead of the second input image. Specifically, the determination unit 310 calculates a difference between the first input image and the corrected image using a region other than a moving object region, to calculate a difference amount.

Further, the determination unit 310a calculates an edge amount using a corrected image instead of the first input image, as with the determination unit 110a according to Embodiment 1. Specifically, the determination unit 310a calculates an edge amount using a region of a corrected image, other than the moving object region.

[3. Locating Moving Object Region]

The following is a description of the details of processing for locating a moving object region, with reference to FIGS. 7A to 7F.

Figure 7A:
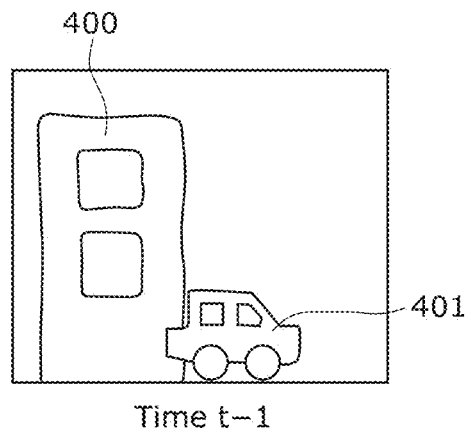
FIG. 7A illustrates an example of an image (second input image) immediately preceding an input image according to Embodiment 2.
Figure 7B:
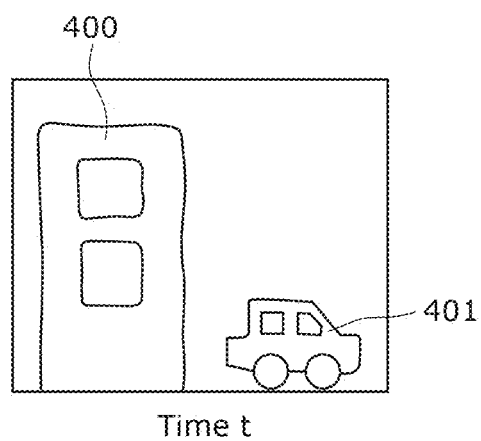
FIG. 7B illustrates an example of an input image (first input image) according to Embodiment 2.
Figure 7C:
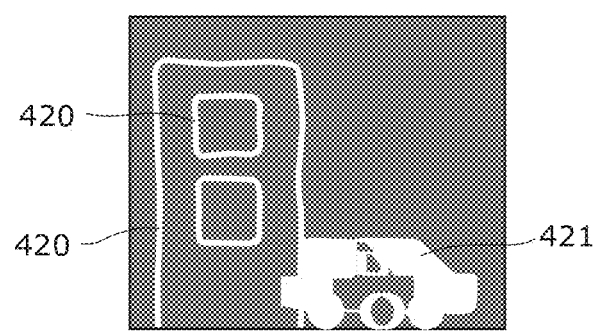
FIG. 7C illustrates an example of a difference image according to Embodiment 2.
Figure 7D:
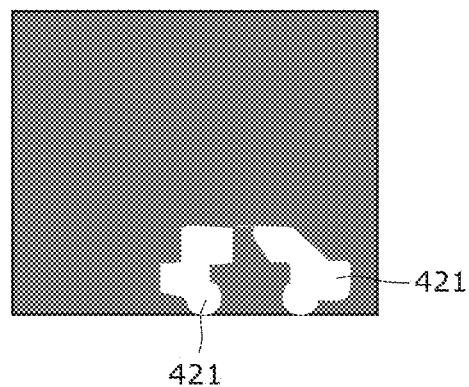
FIG. 7D illustrates an example of a difference image which has been subjected to opening processing according to Embodiment 2.
Figure 7E:
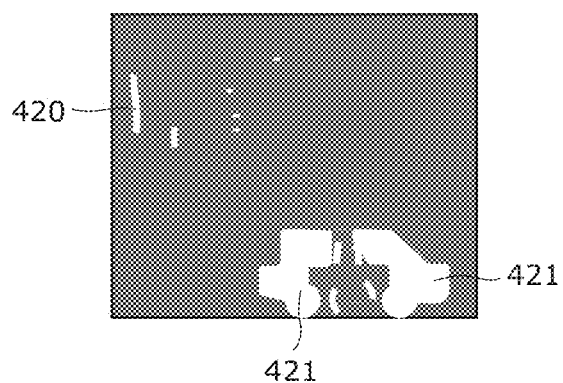
FIG. 7E illustrates an example of a difference image which has been subjected to opening processing according to Embodiment 2.

FIG. 7A illustrates an example of an image (second input image) immediately preceding an input image according to the present embodiment. FIG. 7B illustrates an example of an input image (first input image) according to the present embodiment. FIG. 7C illustrates an example of a difference image according to the present embodiment. FIGS. 7D to 7E illustrate examples of a difference image on which opening processing is performed according to the present embodiment.

As illustrated in FIGS. 7A and 7B, the first input image and the second input image include an object 400 (for example, a building) which does not move and a moving object 401 (for example, a car).

As illustrated in FIG. 7C, a difference image which shows a difference between the first input image and the second input image includes difference regions 420 and 421. It should be noted that to simplify the illustration, binary representation is adopted in which a pixel having no difference is represented by black ("0"), whereas a pixel having a difference is represented by white ("255").

The difference region 420 is a region corresponding to a region at and near an edge of the object 400, and appears due to the effect of atmospheric turbulence. The difference region 421 is a region which appears mainly due to the movement of the moving object 401.

Specifically, only the difference region 420 may be used and the difference region 421 may be excluded in order to appropriately determine an atmospheric turbulence intensity from a difference image.

For example, as illustrated in FIGS. 7A to 7C, edges of the object 400 shift in irregular directions by irregular amounts, due to the effect of atmospheric turbulence, whereas the moving object 401 moves by the same amount in the same direction, as the entire certain pixel region. Accordingly, typically the amplitude of atmospheric turbulence (namely, a shift amount of an edge due to atmospheric turbulence) is often smaller than the amount of the movement of the moving object 401, and thus the difference region 421 is larger than the difference region 420.

In view of this, the locating unit 330 locates the difference region 421 using a difference in pixel area between the difference region 420 and the difference region 421. For example, the locating unit 330 performs opening processing which is a type of morphology processing, as an example of a method for locating a region using a difference in pixel area.

Opening processing is processing in which erosion processing is performed on a predetermined image for a predetermined number of times (which may be referred to as "prescribed number of times", hereinafter), and thereafter dilation processing is performed for the same number of times. Erosion processing is processing for reducing a white pixel region by replacing, if pixels surrounding a white target pixel (for example, eight pixels adjacent to the target pixel) includes even one black pixel, the white pixel with a black pixel. Dilation processing is processing for expanding a white pixel region by replacing pixels surrounding a white target pixel (for example, eight pixels adjacent to the target pixel) with white pixels.

In this manner, for example, erosion processing is performed on a region formed by white pixels for multiple times, all the pixels in this region eventually end up being replaced with black pixels. Accordingly, even if dilation processing is performed thereafter, a white pixel does not appear.

From this, the prescribed number of times in opening processing is set to an appropriate number, thus eliminating a region having a small pixel region and keeping only a region having a large pixel region. Accordingly, opening processing is performed on a difference image illustrated in FIG. 7C for an appropriate prescribed number of times, thus eliminating the difference regions 420 and locating the difference region 421 as illustrated in FIG. 7D.

Figure 7F:
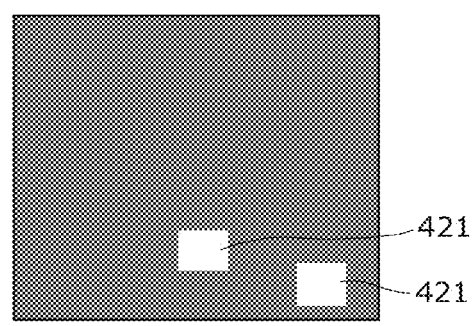
FIG. 7F illustrates an example of a difference image which has been subjected to opening processing according to Embodiment 2.

It should be noted that if, for example, the prescribed number of times is much smaller than an appropriate number of times, the difference regions 420 are not completely eliminated and left, as illustrated in FIG. 7E. On the contrary, if the prescribed number of times is much larger than an appropriate number of times, although the difference regions 420 can be eliminated, the difference regions 421 show a shape different from the original shape, as illustrated in FIG. 7F. In either case, the locating unit 330 cannot appropriately locate a moving object region.

An appropriate prescribed number of times depends on the atmospheric turbulence intensity. For example, the appropriate prescribed number of times is the exact number of times the difference regions 420 disappear. Specifically, if an appropriate prescribed number of times is m, the difference regions 420 remain by the m−1th erosion processing, yet the difference regions 420 will disappear by the mth erosion processing. The number of times for eliminating the difference regions 420 depends on the sizes of the difference regions 420, namely, the shift amount of an edge due to atmospheric turbulence.

Accordingly, the locating unit 330 sets the prescribed number of times to an appropriate number of times according to an atmospheric turbulence intensity.

For example, the locating unit 330 sets the prescribed number of times to a value that increases with an increase in an atmospheric turbulence intensity. In this manner, the locating unit 330 eliminates the large difference regions 420 resulting from large atmospheric turbulence, and determines a remaining region (the difference region 421) to be a moving object region.

The locating unit 330 sets the prescribed number of times to a value that decreases with a decrease in an atmospheric turbulence intensity. In this manner, the locating unit 330 eliminates the small difference regions 420 resulting from small atmospheric turbulence, and determines a remaining region (the difference region 421) to be a moving object region.

To put it in a simpler way, the locating unit 330 determines a closed region having a predetermined size or more to be a moving object region, the closed region being included in a difference region. At this time, an example of a parameter corresponding to a predetermined size used as the criterion for determining whether a region is a moving object region is a prescribed number of times. Specifically, the locating unit 330 sets a prescribed number of times to a value that increases with an increase in an atmospheric turbulence intensity, to determine a closed difference region having a size larger than a first size to be a moving object region. Furthermore, the locating unit 330 sets a prescribed number of times to a value that decreases with a decrease in an atmospheric turbulence intensity, to determine a closed difference region having a size larger than a second size (< the first size) to be a moving object region.

The locating unit 330a illustrated in FIG. 6B performs the same or similar processing as/to the processing performed by the locating unit 330 described above, except that a first input image and a corrected image are used. For example, the locating unit 330a calculates a difference between the first input image and the corrected image.

It should be noted that an appropriate prescribed number of times may not be the exact number of times the difference regions 420 disappear. For example, in the above example, an appropriate prescribed number of times may be m−1 or m+1. Specifically, the locating unit 330 may set the prescribed number of times to an appropriate number such that much of the difference region 421 influenced by a moving object remains while reducing the difference regions 420 influenced by atmospheric turbulence.

[4. Operation]
[4-1. When No Corrected Image is Used]

The following describes operation of the image processing devices 300 and 300a according to the present embodiment, with reference to FIGS. 8A to 9B. The first describes operation of the image processing device 300 according to the present embodiment, or specifically, processing for correcting atmospheric turbulence in an input image without using a corrected image, with reference to FIGS. 8A to 8C.

Figure 8A:
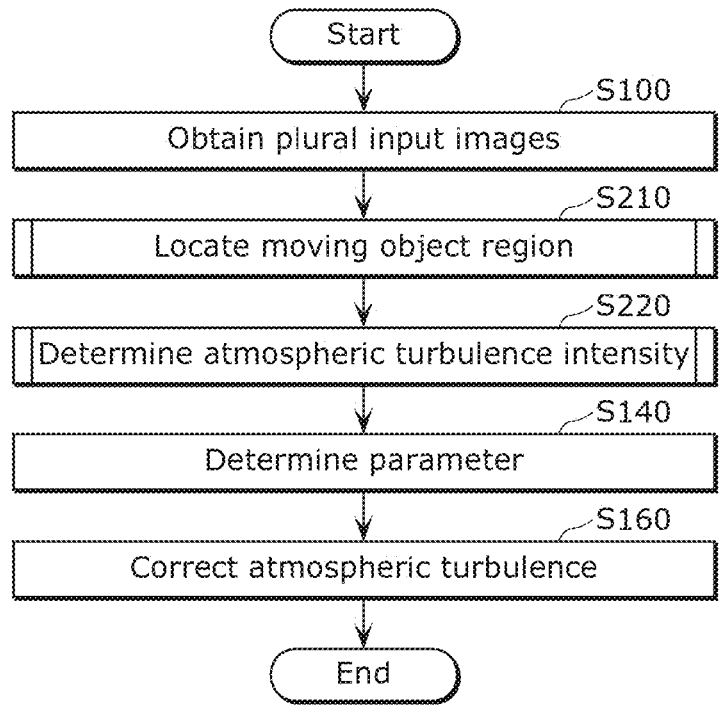
FIG. 8A is a flowchart illustrating an example of operation of the image processing device according to Embodiment 2.
Figure 8B:
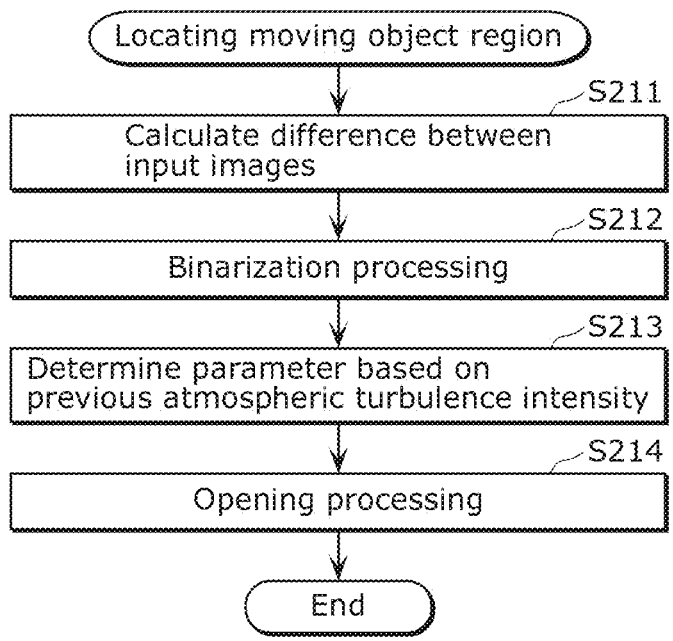
FIG. 8B is a flowchart illustrating an example of processing for locating a moving object region according to Embodiment 2.
Figure 8C:
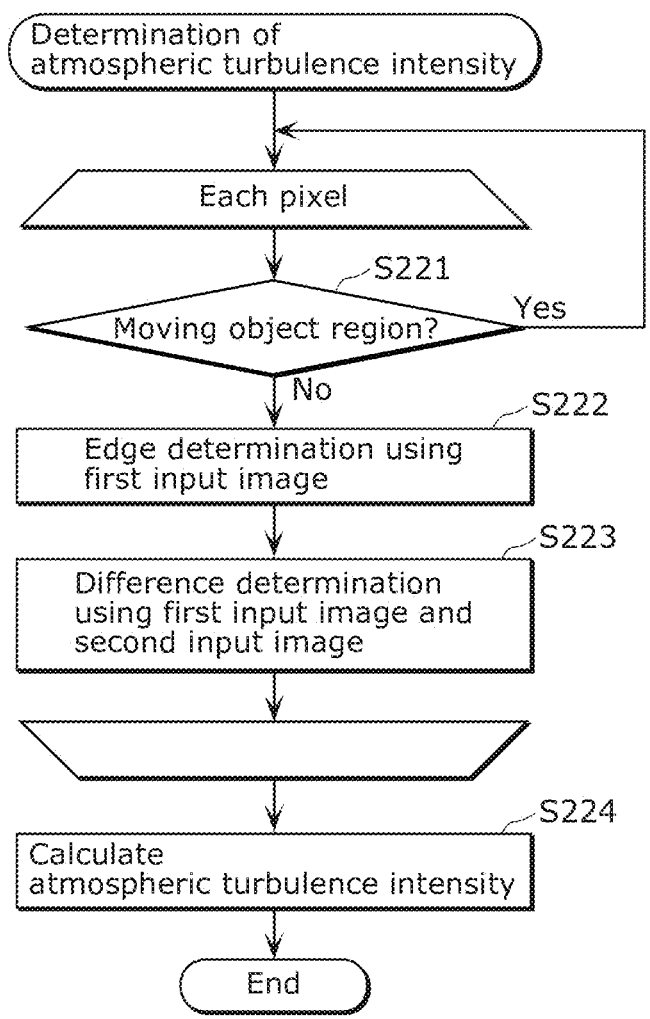
FIG. 8C is a flowchart illustrating an example of processing for determining an atmospheric turbulence intensity according to Embodiment 2.

FIG. 8A is a flowchart illustrating operation of the image processing device 300 according to the present embodiment. FIG. 8B is a flowchart illustrating processing for locating a moving object region according to the present embodiment. FIG. 8C is a flowchart illustrating processing for determining an atmospheric turbulence intensity according to the present embodiment. It should be noted that the following mainly describes the differences from the operation illustrated in FIGS. 4A and 4B, and may not described the same points.

As illustrated in FIG. 8A, first, the determination unit 310 and the locating unit 330 obtain plural input images (S100). Then, the locating unit 330 locates a moving object region (S210). A description of the details of a method for locating a moving object region is given later with reference to FIG. 8B.

Next, the determination unit 310 determines an atmospheric turbulence intensity (S220). At this time, the determination unit 310 determines the atmospheric turbulence intensity using a region other than the moving object region located by the locating unit 330. A description of the details of a method for determining the atmospheric turbulence intensity is given later with reference to FIG. 8C.

Next, the parameter determination unit 122 determines a parameter (S140), and the atmospheric turbulence correction unit 121 corrects atmospheric turbulence in a first input image using the determined parameter (S160), as with Embodiment 1.

Here, a description is given of a method for locating a moving object region by the locating unit 330, with reference to FIG. 8B.

As illustrated in FIG. 8B, the locating unit 330 calculates a difference between plural input image frames (S211). Specifically, the locating unit 330 generates a difference image which shows a difference between the first input image and the second input image.

Next, the locating unit 330 performs binarization processing on the difference image (S212). Specifically, the locating unit 330 changes the value of a pixel having a difference whose absolute value is a predetermined threshold or less to 0, and changes the value of a pixel having a difference whose absolute value is greater than the predetermined threshold to 255, thus performing binarization processing on the difference image. This generates a binarized difference image as illustrated in FIG. 7C, for example.

Next, the locating unit 330 determines a parameter based on an atmospheric turbulence intensity used immediately before (S213). Specifically, the locating unit 330 sets the prescribed number of times to a value that increases with an increase in the atmospheric turbulence intensity, and sets the prescribed number of times to a value that decreases with a decrease in the atmospheric turbulence intensity.

Lastly, the locating unit 330 performs opening processing on the binarized difference image (S214). This allows a moving object region to be appropriately located, as illustrated in FIG. 7D.

The following describes a method for determining the atmospheric turbulence intensity by the determination unit 310, with reference to FIG. 8C.

As illustrated in FIG. 8C, the determination unit 310 determines whether a pixel of interest included in the first input image is included in a moving object region (S221). If the pixel of interest is included in a moving object region (Yes in S221), the determination unit 310 makes region determination using another pixel as a pixel of interest.

If the pixel of interest is not included in the moving object region (No in S221), the determination unit 310 determines whether the pixel of interest in the first input image is an edge pixel (S222). If the pixel of interest is an edge pixel, the determination unit 310 increments the counter value indicating the number of edge pixels, whereas the determination unit 310 keeps the counter value as it is if the pixel of interest is not an edge pixel.

Next, the determination unit 310 determines whether the pixel of interest in the first input image is a difference pixel (S223). Specifically, the determination unit 310 calculates a difference between the pixel of interest in the first input image and the pixel of interest in the second input image, and determines whether the calculated difference is a predetermined threshold or more. If the difference is the predetermined threshold or more, the determination unit 310 increments the counter value indicating the difference amount between adjacent images, whereas if the difference is smaller than the predetermined threshold, the determination unit 310 keeps the counter value as it is.

Next, using another pixel as a pixel of interest, region determination (S221), edge determination (S222), and difference determination (S223) are repeated until processing on all the pixels in the first input image is completed.

Lastly, the determination unit 310 calculates an atmospheric turbulence intensity based on Equation 1 (S224).

This excludes a pixel included in a moving object region, from pixels to be used for calculation of an atmospheric turbulence intensity, thus reducing the effect of the moving object 401. Accordingly, a more appropriate atmospheric turbulence intensity can be calculated.

[4-2. When Corrected Image is Used]

Figure 9A:
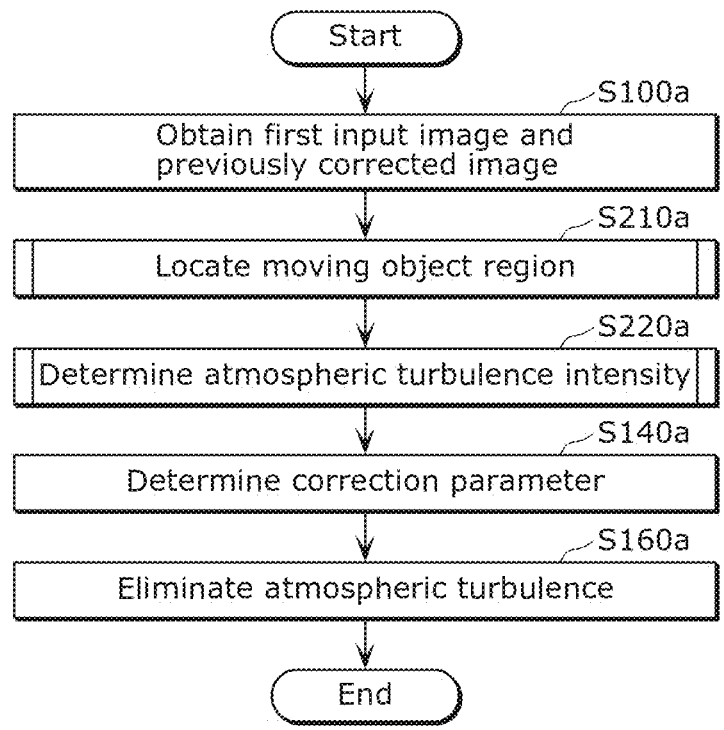
FIG. 9A is a flowchart illustrating another example of operation of the image processing device according to Embodiment 2.
Figure 9B:
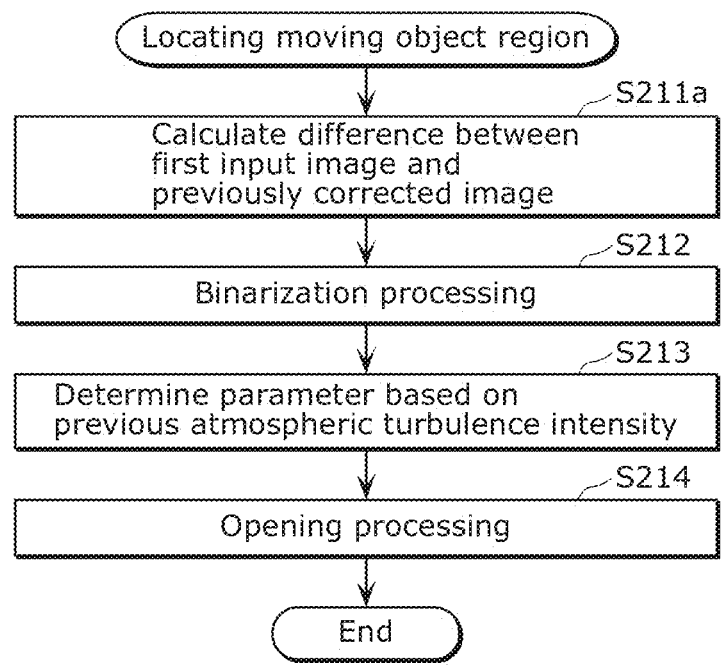
FIG. 9B is a flowchart illustrating another example of processing for locating a moving object region according to Embodiment 2.
Figure 9C:
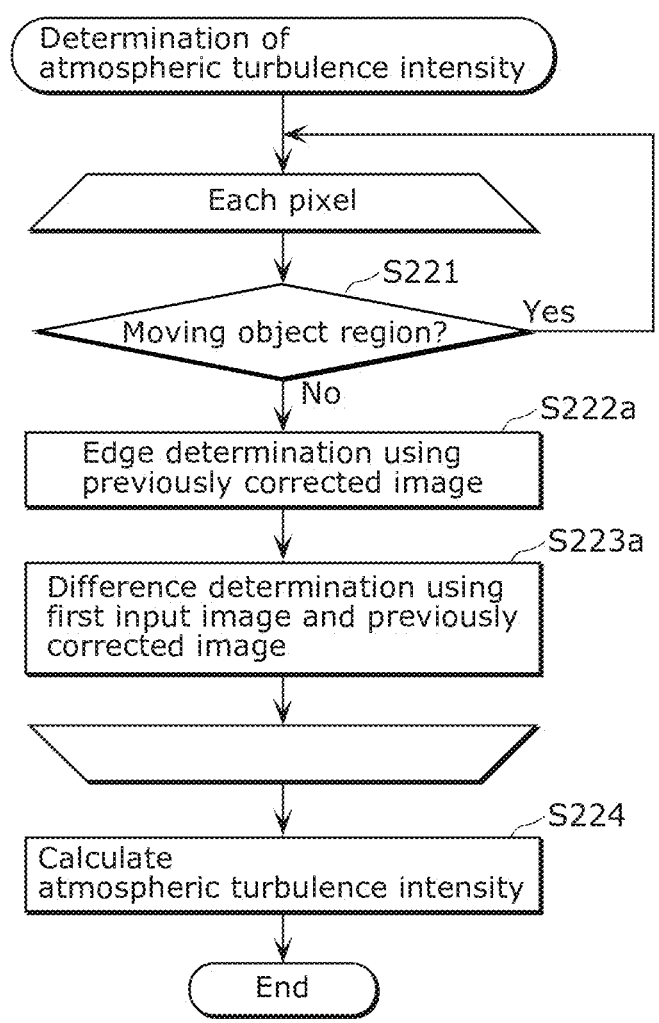
FIG. 9C is a flowchart illustrating another example of processing for determining an atmospheric turbulence intensity according to Embodiment 2.

Next is a description of operation of the image processing device 300a according to the present embodiment, or specifically, processing for correcting atmospheric turbulence in an input image using a corrected image, with reference to FIGS. 9A to 9C.

FIG. 9A is a flowchart illustrating operation of the image processing device 300a according to the present embodiment. FIG. 9B is a flowchart illustrating processing for locating a moving object region according to the present embodiment. FIG. 9C is a flowchart illustrating processing for determining an atmospheric turbulence intensity according to the present embodiment.

As illustrated in FIG. 9A, first, the determination unit 310a and the locating unit 330a obtain the first input image and a previously corrected image (S100a). Next, the locating unit 330a locates a moving object region (S210a). The details of a method for locating a moving object region are as illustrated in FIG. 9B.

Specifically, as illustrated in FIG. 9B, first, the locating unit 330a calculates a difference between the first input image and a previously corrected image (S211a). Subsequent processes are the same as those by the locating unit 330 illustrated in FIG. 8B.

Next, the determination unit 310a determines an atmospheric turbulence intensity (S220a). A description of the details of a method for determining an atmospheric turbulence intensity will be given later, with reference to FIG. 9C.

In the following steps, the parameter determination unit 122a determines a parameter (S140a), and the atmospheric turbulence correction unit 121a corrects atmospheric turbulence in the first input image using the determined parameter (S160a), as with the image processing device 100a according to Embodiment 1.

Here, a description is given of a method for determining an atmospheric turbulence intensity by the determination unit 310a, with reference to FIG. 9C.

As illustrated in FIG. 9C, the determination unit 310a determines whether a pixel of interest included in the first input image is included in a moving object region (S221). If the pixel of interest is included in a moving object region (Yes in S221), the determination unit 310a makes region determination using another pixel as a pixel of interest.

If the pixel of interest is not included in the moving object region (No in S221), the determination unit 310a determines whether the pixel of interest in a corrected image is an edge pixel (S222a). If the pixel of interest is an edge pixel, the determination unit 310a increments the counter value indicating the number of edge pixels, whereas if the pixel of interest is not an edge pixel, the determination unit 310a keeps the counter value as it is.

Next, the determination unit 310a determines whether the pixel of interest in the first input image is a difference pixel (S223a). Specifically, the determination unit 310a calculates a difference between the pixel of interest in the first input image and the pixel of interest in a corrected image, and determines whether the calculated difference is the predetermined threshold or more. If the difference is the predetermined threshold or more, the determination unit 310a increments the counter value indicating the difference amount between adjacent images, whereas if the difference is smaller than the predetermined threshold, the determination unit 310a keeps the counter value as it is.

Next, using another pixel as a pixel of interest, region determination (S221), edge determination (S222a), and difference determination (S223a) are repeated until processing on all the pixels in the first input image is completed.

Lastly, the determination unit 310 calculates an atmospheric turbulence intensity based on Equation 1 (S224).

This excludes a pixel included in a moving object region, from pixels to be used for calculation of an atmospheric turbulence intensity, thus reducing the effect of the moving object 401. Accordingly, a more appropriate atmospheric turbulence intensity can be calculated.

[5. Conclusion]

As described above, the image processing device 300 according to the present embodiment further includes the locating unit 330 configured to locate a moving object region that includes a moving object which moves between the first input image and the frame temporally preceding, wherein the determination unit 310 uses a region other than the moving object region to determine the atmospheric turbulence intensity.

In this manner, the atmospheric turbulence intensity is determined using a region other than the moving object region, and thus even if an input image includes a moving object which moves, an atmospheric turbulence intensity can be appropriately determined, and atmospheric turbulence can be appropriately corrected.

For example, the moving object region located by the locating unit 330 is a closed region having a predetermined size or more, the closed region being included in a difference region formed by the pixels each having a difference in pixel value between the first input image and the frame temporally preceding, the difference being the predetermined threshold or more.

Typically, the amplitude of atmospheric turbulence (namely, the shift amount of an edge due to atmospheric turbulence) is often smaller than the amount of movement of a moving object, and thus a closed region having a predetermined size or more, which is included in a difference region, can be regarded as a moving object region. Accordingly, a moving object region can be located appropriately.

For example, the locating unit 330 is configured to determine a parameter corresponding to the predetermined size, according to the atmospheric turbulence intensity determined by the determination unit 310.

In this manner, a parameter used as a threshold for locating a moving object region in a difference region is determined according to the atmospheric turbulence intensity, and thus a moving object region can be located appropriately. Accordingly, the atmospheric turbulence intensity can be determined with high precision, and atmospheric turbulence can be corrected more appropriately.

Embodiment 3

The following describes non-limiting Embodiment 3, with reference to FIGS. 10A to 13.

[1. Outline of Image Processing Device]

Figure 10A:
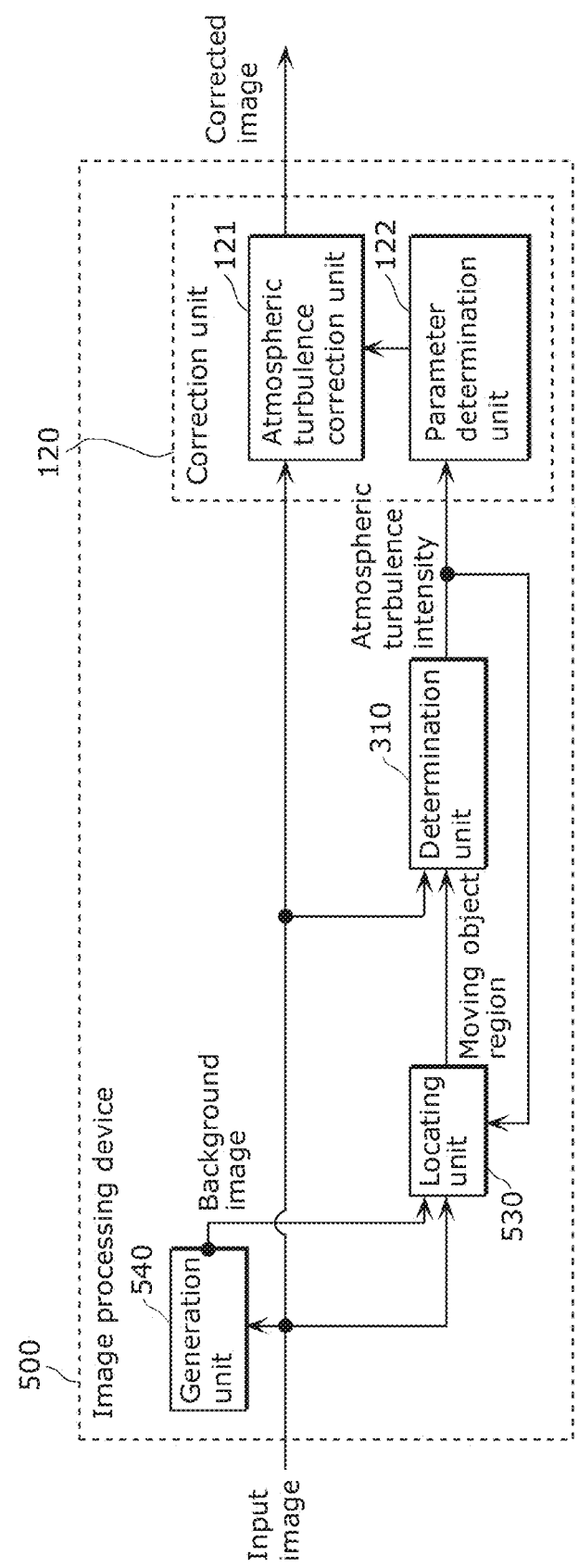
FIG. 10A is a block diagram illustrating a configuration of an image processing device according to Embodiment 3.
Figure 10B:
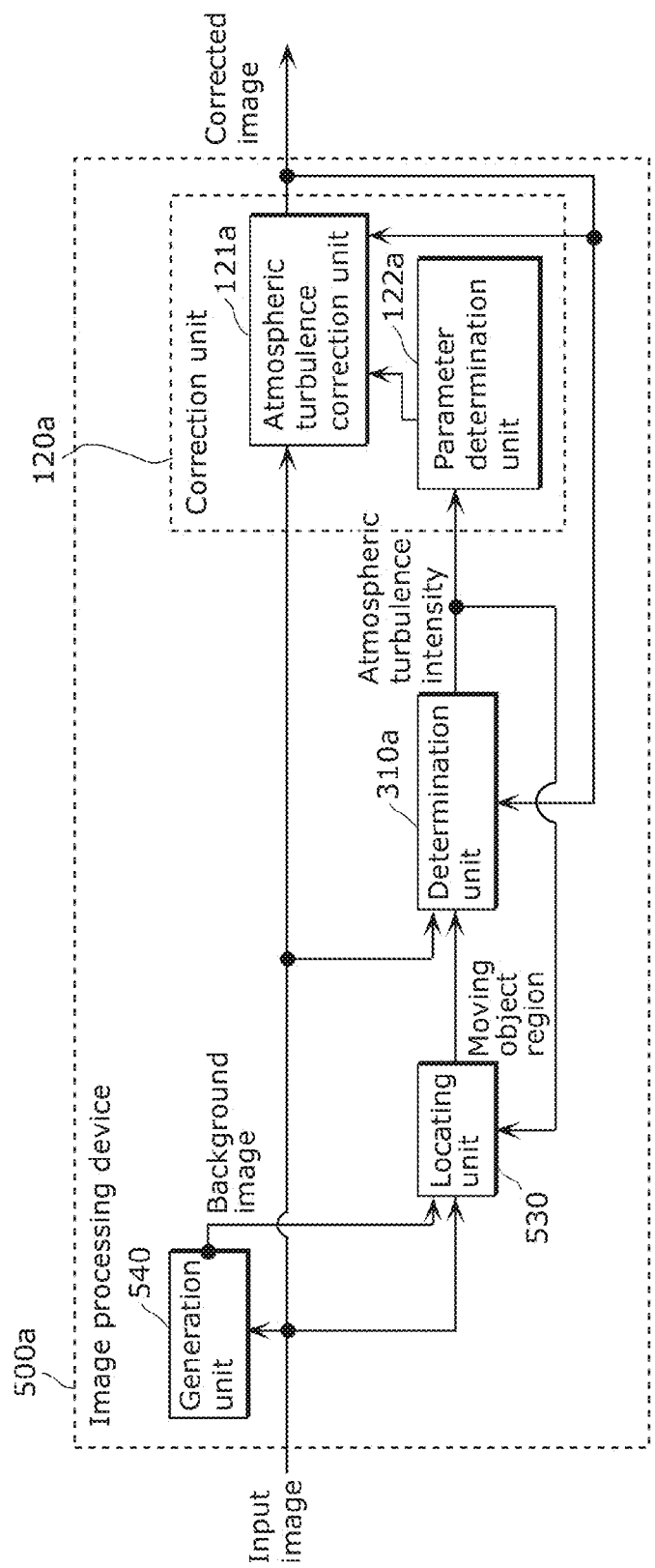
FIG. 10B is a block diagram illustrating another configuration of the image processing device according to Embodiment 3.

The first describes configurations of image processing devices according to the present embodiment, with reference to FIGS. 10A and 10B. FIGS. 10A and 10B are block diagrams illustrating examples of configurations of image processing devices according to the present embodiment.

Image processing devices 500 and 500a according to the present embodiment can correct atmospheric turbulence more appropriately if an input image includes a moving object.

The image processing devices 300 and 300a according to Embodiment 2 cannot sufficiently express the movement of the moving object 401 using the difference region 421, as illustrated in FIG. 7C, for example. Accordingly, this raises a demand for locating a moving object region with higher precision.

It should be noted that the image processing devices according to the present embodiment also perform different processing for when a corrected image is not used as one of plural image frames and for when a corrected image is used as one of plural image frames, as with Embodiments 1 and 2.

The following describes the configuration of the image processing device 500 for when a corrected image is not used, with reference to FIG. 10A. Further, a description is given of the configuration of the image processing device 500a for when a corrected image is used, with reference to FIG. 10B.

[2. Detailed Configurations of Image Processing Devices]

As illustrated in FIG. 10A, the image processing device 500 differs from the image processing device 300 illustrated in FIG. 6A in that a locating unit 530 is included instead of the locating unit 330, and a generation unit 540 is newly included. Furthermore, as illustrated in FIG. 10B, the image processing device 500a differs from the image processing device 300a illustrated in FIG. 6B in that a locating unit 530 is included instead of the locating unit 330a, and a generation unit 540 is newly included. The following mainly describes the differences, and may not describe the same points.

[2-1. Generation Unit]

The generation units 540 illustrated in FIGS. 10A and 10B each generate a background image using an input image. A background image is an image which does not include a moving object. Specifically, a background image is an image having no moving object captured, which is obtained when an image of a space is captured with a fixed camera. For example, atmospheric turbulence is sufficiently inhibited or not occurring in a background image.

The generation unit 540 may generate a background image by, for example, eliminating a moving object from a video captured with a fixed camera. Specifically, the generation unit 540 can eliminate a moving object and generate a background image by averaging images of a sufficiently large number of frames, namely, hundreds of image frames, for instance. In this case, even if atmospheric turbulence occurs in a period for capturing a video, atmospheric turbulence can be eliminated by averaging, and thus atmospheric turbulence is sufficiently inhibited in the generated background image. The generation unit 540 may generate a background image using any technique other than this.

[2-2. Locating Unit]

The locating unit 530 illustrated in FIGS. 10A and 10B locates a moving object region using an input image and a background image. Specifically, detailed operation of the locating unit 530 is the same as that of the locating unit 330 according to Embodiment 2 except that a background image is used instead of a second input image.

[3. Locating Moving Object Region]

Figure 11A:
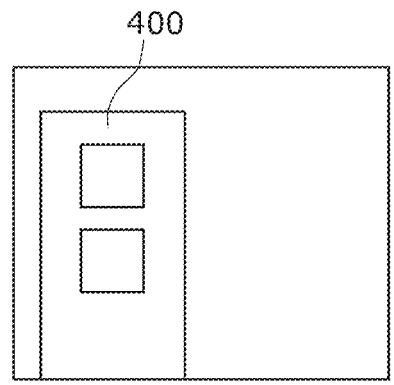
FIG. 11A illustrates an example of a background image according to Embodiment 3.
Figure 11B:
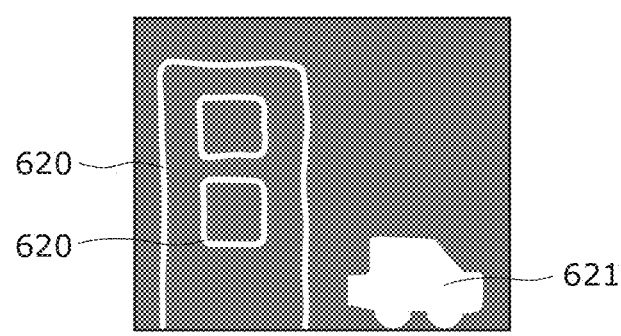
FIG. 11B illustrates an example of a difference image according to Embodiment 3.
Figure 11C:
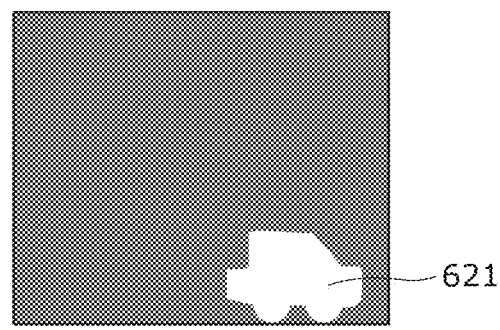
FIG. 11C illustrates an example of a difference image which has been subjected to opening processing according to Embodiment 3.

The following describes details of processing for locating a moving object region, with reference to FIGS. 11A to 11C.

FIG. 11A illustrates an example of a background image according to the present embodiment. As illustrated in FIG. 11A, the background image does not include a moving object, but includes an object 400 (building) which does not move.

FIG. 11B illustrates an example of a difference image according to the present embodiment. Specifically, FIG. 11B illustrates a difference image showing a difference between the background image illustrated in FIG. 11A and the first input image illustrated in FIG. 7B.

In a difference image, an object which is not in the background image appears as a difference region. Specifically, difference regions 620 due to shifts of edges caused by atmospheric turbulence and a difference region 621 due to the moving object 401 appear in the difference image. Specifically, the moving object 401 is not included in the background image, and thus the moving object 401 itself appears as the difference region 621.

FIG. 11C illustrates an example of a difference image which has been subjected to opening processing according to the present embodiment. As is clear from the comparison between FIGS. 11C and 7D, opening processing allows a moving object region (the difference region 621) to be located more accurately. Accordingly, using a background image allows locating a moving object region with high precision.

[4. Operation]

[4-1. When No Corrected Image is Used]

Figure 12A:
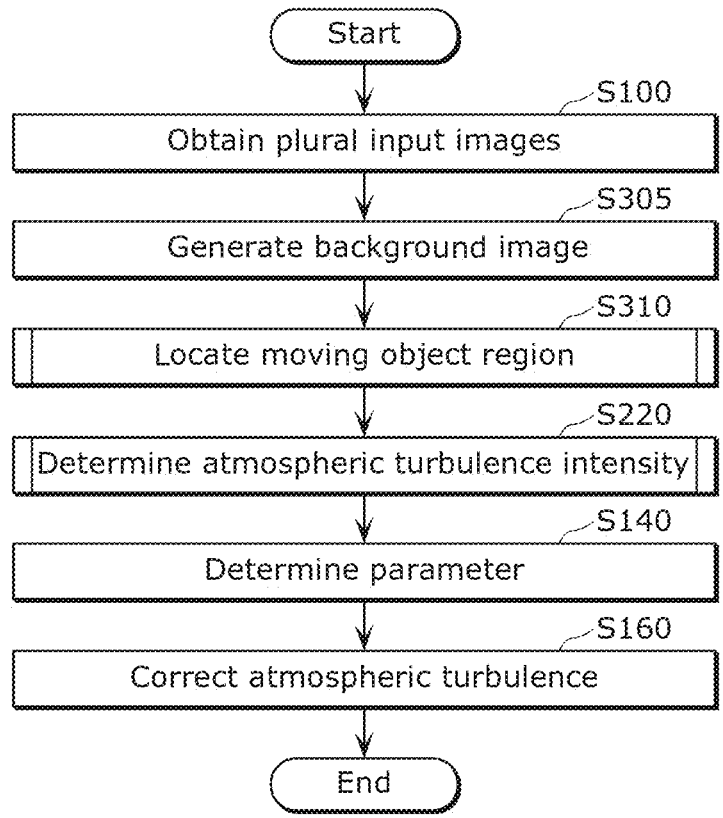
FIG. 12A is a flowchart illustrating an example of operation of the image processing device according to Embodiment 3.
Figure 12B:
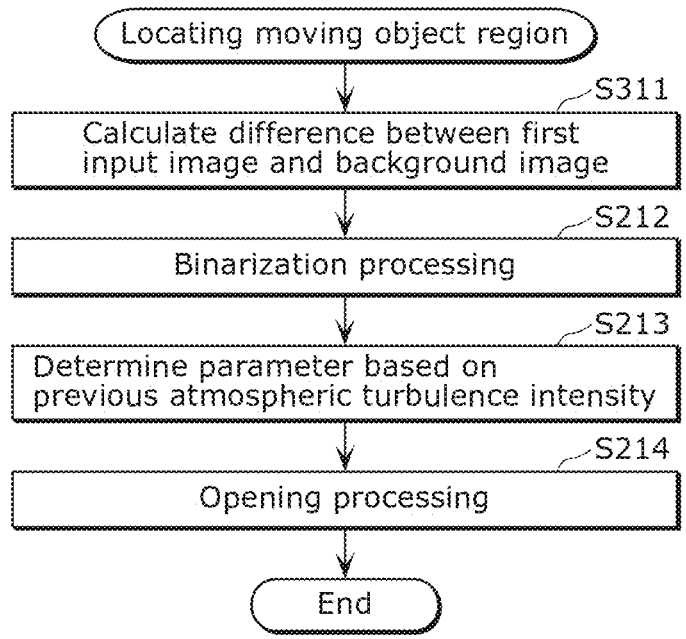
FIG. 12B is a flowchart illustrating an example of processing for locating a moving object region according to Embodiment 3.
Figure 13:
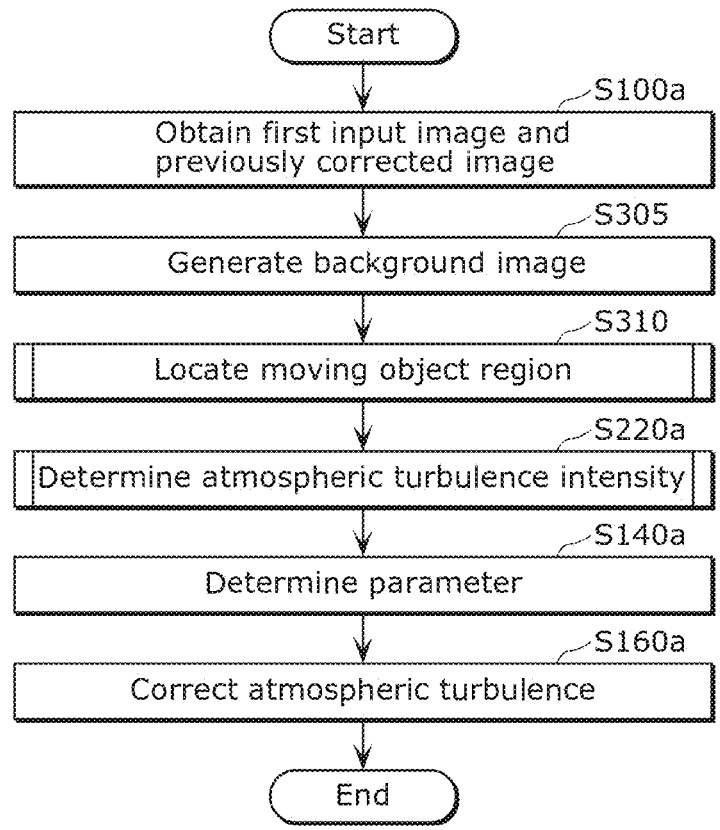
FIG. 13 is a flowchart illustrating another example of operation of the image processing device according to Embodiment 3.

The following describes operation of the image processing devices 500 and 500a according to the present embodiment, with reference to FIGS. 12A to 13. The first describes operation of the image processing device 500 according to the present embodiment, or specifically, processing for correcting atmospheric turbulence in an input image without using a corrected image, with reference to FIGS. 12A and 12B.

FIG. 12A is a flowchart illustrating operation of the image processing device 500 according to the present embodiment. FIG. 12B is a flowchart illustrating processing for locating a moving object region according to the present embodiment.

As illustrated in FIG. 12A, first, the determination unit 310 and the locating unit 530 obtain plural input images (S100). Next, the generation unit 540 generates a background image (S305). It should be noted that if a background image is generated in advance and stored in, for instance, a memory, the generation unit 540 may read and obtain a background image from the memory or the like.

Next, the locating unit 530 locates a moving object region (S310). A description is later given of the details of a method for locating a moving object region with reference to FIG. 12B.

Subsequent processing is the same as operation of the image processing device 300 illustrated in FIG. 8A, and thus a description thereof is omitted.

Here, a description is given of a method for locating a moving object region by the locating unit 530, with reference to FIG. 12B.

As illustrated in FIG. 12B, the locating unit 530 calculates a difference between a first input image and a background image (S311). It should be noted that subsequent processes are the same as those performed by the locating unit 330 illustrated in FIG. 8B.

Accordingly, calculation of a difference from the background image which does not include a moving object allows locating a moving object region with high precision.

[4-2. When Corrected Image is Used]

The following describes operation of the image processing device 500a according to the present embodiment, or specifically, processing for correcting atmospheric turbulence in an input image using a corrected image, with reference to FIG. 13.

As illustrated in FIG. 13, first, the determination unit 310a and the locating unit 530 obtain the first input image and a previously corrected image (S100a). The following processes are the same as those in FIGS. 9A and 12A, and thus a description thereof is omitted.

[5. Conclusion]

As described above, in the image processing device 500 according to the present embodiment, the locating unit 530 locates a moving object region using a first input image and a background image which does not include a moving object.

Accordingly, calculation of a difference between the first input image and the background image allows locating a moving object region with sufficient accuracy since the background image does not include a moving object. Thus, an atmospheric turbulence intensity can be determined appropriately, and atmospheric turbulence in the first input image can be corrected more appropriately.

Other Embodiments

The above has described non-limiting embodiments by way of example of the technique disclosed in this application. However, the technique according to the present disclosure is not limited to this, and is also applicable to embodiments to which changes, replacement, addition, and omission, for instance, are made as appropriate. Furthermore, a new embodiment may be achieved by combining constituent elements described in the above embodiments.

Thus, the following describes another non-limiting embodiment as an example.

For example, although the above embodiments have described examples in which an atmospheric turbulence intensity is the calculated result from Equation 1, the atmospheric turbulence intensity is not limited to this. The atmospheric turbulence intensity may have a value that increases with an increase in a ratio of the number of pixels each having a difference in pixel value between the first input image and a previous frame to the number of edge pixels included in a first input image or a previous frame, the difference being a predetermined threshold or more.

In the above embodiments, although an atmospheric turbulence intensity is a calculated result from Equation 1 and thus is a value which continuously varies, the atmospheric turbulence intensity is not limited to such a value. For example, the atmospheric turbulence intensity may have discrete values such as "low", "middle", and "high", as illustrated in FIG. 2. For example, if the calculated result from Equation 1 is a value included in a first range, the determination unit may determine the atmospheric turbulence intensity to be "low", whereas if the calculated result from Equation 1 is a value included in a second range (> the first range), the determination unit may determine the atmospheric turbulence intensity to be "middle".

Although the above embodiments have described examples in which an atmospheric turbulence intensity is determined using the number of edge pixels and the number of difference pixels, the present disclosure is not limited to this. Although the number of edge pixels means a value indicating an edge amount, the number of edge pixels may mean the length of an edge, for example. Similarly, the number of difference pixels may be a sum of absolute differences, for example.

Figure 14:
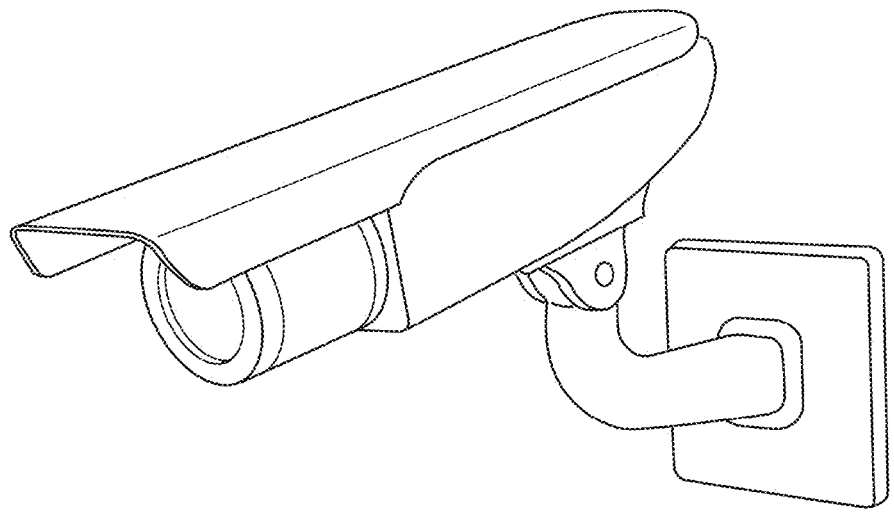
FIG. 14 illustrates an example of a monitoring camera product which includes the image processing device according to an embodiment.

Although the above embodiments have described image processing devices, the present disclosure is not limited to the image processing devices. For example, the present disclosure can be achieved as a monitoring camera which includes one of the image processing devices described above. For example, FIG. 14 illustrates an example of a monitoring camera product according to a variation of an embodiment. The monitoring camera according to the present disclosure is, for example, a camera installed to capture images outside, and can be used to, for instance, monitor the traffic volume, as an example.

Alternatively, the monitoring camera according to the present disclosure can be achieved as an underwater camera which captures images underwater. For example, the underwater camera is applicable to monitoring aquatic lives and testing articles put in water, for instance, at a factory or the like.

The present disclosure can also be achieved as an image processing method. For example, an image processing method according to the present disclosure is an image processing method for correcting atmospheric turbulence in an input image included in a video, the image processing method including: determining an atmospheric turbulence intensity which indicates an intensity of the atmospheric turbulence; and correcting the atmospheric turbulence in the input image, according to the determined atmospheric turbulence intensity, wherein the determined atmospheric turbulence intensity has a value that increases with an increase in a ratio of a total number of pixels each having a difference in pixel value between the input image and a frame temporally preceding the input image to a total number of edge pixels included in the input image or the frame temporally preceding, the difference being a predetermined threshold or more.

It should be noted that constituent elements included in the image processing device 100 and other devices according to the present disclosure (the determination units 110, 110a, 310, and 310a, the correction units 120 and 120a, the atmospheric turbulence correction units 121 and 121a, the parameter determination units 122 and 122a, the locating units 330, 330a, and 530, and the generation unit 540) may be achieved by software, such as a program executed on a computer that includes a central processing unit (CPU), RAM, read only memory (ROM), a communication interface, an I/O port, a hard disk, a display, and others, or may be achieved by hardware such as an electronic circuit.

The above has described embodiments to exemplify the technique according to the present disclosure. The accompanying drawings and detailed description are provided therefor.

Thus, the constituent elements illustrated in the accompanying drawings and described in the detailed description may include a constituent element not essential for addressing the problem in order to exemplify the above technique, in addition to a constituent element necessary for addressing the problem. Accordingly, because of a mere fact that such a non-essential constituent element is illustrated in the accompanying drawings and described in the detailed description, the non-essential constituent element should not be immediately determined to be required.

The above embodiments are intended to exemplify the technique according to the present disclosure, and thus various changes, replacement, addition, and omission, for instance, can be made to the above embodiments within the scope and an equivalent scope of the claims.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The image processing device, the monitoring camera, and the image processing method according to the present disclosure can be used for, for example, a video recorder, a television, a camera, and others.

The invention claimed is:

1. An image processing device for correcting atmospheric turbulence in a first input image included in a video, the image processing device comprising:
   a determiner, implemented by a processor, configured to determine an atmospheric turbulence intensity which indicates an intensity of the atmospheric turbulence; and
   a corrector, implemented by the processor, configured to correct the atmospheric turbulence in the first input image, according to the atmospheric turbulence intensity determined by the determiner,
   wherein the atmospheric turbulence intensity determined by the determiner has a value that increases with an increase in a ratio of a total number of pixels each having a difference in pixel value between the first input image and a frame temporally preceding the first input image to a total number of edge pixels included in the first input image or the frame temporally preceding, the difference being a predetermined threshold or more.

2. The image processing device according to claim 1, wherein the frame temporally preceding is a second input image input prior to the first input image or a corrected image generated by the corrector correcting atmospheric turbulence in the second input image.

3. The image processing device according to claim 2, wherein the corrector includes:
   an atmospheric turbulence corrector configured to combine plural frames including the first input image, to correct the atmospheric turbulence in the first input image; and
   a parameter determiner configured to determine a parameter to be used for combining the plural frames, according to the atmospheric turbulence intensity determined by the determiner.

4. The image processing device according to claim 3, wherein:
   the atmospheric turbulence corrector is configured to average the plural frames to combine the plural frames, and
   the parameter determined by the parameter determiner according to the atmospheric turbulence intensity determined by the determiner is a total number of frames to be used for averaging the plural frames.

5. The image processing device according to claim 3, wherein:
   the atmospheric turbulence corrector is configured to calculate a weighted sum of the first input image and the corrected image, to combine the plural frames, and
   the parameter determined by the parameter determiner according to the atmospheric turbulence intensity determined by the determiner is a weight for calculating the weighted sum.

6. The image processing device according to claim 3, wherein:
   the corrector further includes an image sharpener configured to sharpen an image,
   the parameter determined by the parameter determiner according to the atmospheric turbulence intensity determined by the determiner is a filter size for sharpening by the image sharpener, and
   the image sharpener is configured to sharpen the first input image in which the atmospheric turbulence has been corrected, using the filter size determined by the parameter determiner.

7. The image processing device according to claim 1, further comprising
   a locator, implemented by the processor, configured to locate a moving object region that includes a moving object which moves between the first input image and the frame temporally preceding,
   wherein the determiner uses a region other than the moving object region to determine the atmospheric turbulence intensity.

8. The image processing device according to claim 7, wherein the moving object region located by the locator is a closed region having a predetermined size or more, the closed region being included in a difference region formed by the pixels each having a difference in pixel value between the first input image and the frame temporally preceding, the difference being the predetermined threshold or more.

9. The image processing device according to claim 8, wherein the locator is configured to determine a parameter corresponding to the predetermined size, according to the atmospheric turbulence intensity determined by the determiner.

10. The image processing device according to claim 7, wherein the locator uses the first input image and a background image which does not include the moving object, to locate the moving object region.

11. A monitoring camera comprising
the image processing device according to claim 1.

12. An image processing method for correcting atmospheric turbulence in an input image included in a video, the image processing method comprising:
determining, by a processor, an atmospheric turbulence intensity which indicates an intensity of the atmospheric turbulence; and
correcting, by the processor, the atmospheric turbulence in the input image, according to the determined atmospheric turbulence intensity,
wherein the determined atmospheric turbulence intensity has a value that increases with an increase in a ratio of a total number of pixels each having a difference in pixel value between the input image and a frame temporally preceding the input image to a total number of edge pixels included in the input image or the frame temporally preceding, the difference being a predetermined threshold or more.

13. An image processing device for correcting atmospheric turbulence in a first input image included in a video, the image processing device comprising:
a processor; and
a memory storing a program,
wherein the program, when executed by the processor, causes the processor to perform:
determining an atmospheric turbulence intensity which indicates an intensity of the atmospheric turbulence; and
correcting the atmospheric turbulence in the first input image, according to the determined atmospheric turbulence intensity,
wherein the determined atmospheric turbulence intensity has a value that increases with an increase in a ratio of a total number of pixels each having a difference in pixel value between the first input image and a frame temporally preceding the first input image to a total number of edge pixels included in the first input image or the frame temporally preceding, the difference being a predetermined threshold or more.

14. The image processing device according to claim 13, wherein the frame temporally preceding is a second input image input prior to the first input image or a corrected image generated by correcting atmospheric turbulence in the second input image.

15. The image processing device according to claim 14, wherein the program, when executed by the processor, further causes the processor to perform:
combining plural frames including the first input image, to correct the atmospheric turbulence in the first input image; and
determining a parameter to be used for combining the plural frames, according to the determined atmospheric turbulence intensity.

16. The image processing device according to claim 15, wherein:
the program, when executed by the processor, further causes the processor to perform averaging the plural frames to combine the plural frames, and
the determined parameter according to the determined atmospheric turbulence intensity is a total number of frames to be used for averaging the plural frames.

17. The image processing device according to claim 15, wherein:
the program, when executed by the processor, further causes the processor to perform calculating a weighted sum of the first input image and the corrected image, to combine the plural frames, and
the determined parameter according to the determined atmospheric turbulence intensity is a weight for calculating the weighted sum.

18. The image processing device according to claim 15, wherein:
the program, when executed by the processor, further causes the processor to perform sharpening an image,
the determined parameter according to the determined atmospheric turbulence intensity is a filter size for sharpening, and
the program, when executed by the processor, further causes the processor to perform sharpening the first input image in which the atmospheric turbulence has been corrected, using the filter size.

19. The image processing device according to claim 13, wherein:
the program, when executed by the processor, further causes the processor to perform locating a moving object region that includes a moving object which moves between the first input image and the frame temporally preceding, and
in the determining, a region other than the moving object region is used to determine the atmospheric turbulence intensity.

20. The image processing device according to claim 19, wherein the located moving object region is a closed region having a predetermined size or more, the closed region being included in a difference region formed by the pixels each having a difference in pixel value between the first input image and the frame temporally preceding, the difference being the predetermined threshold or more.

* * * * *